(12) United States Patent
Obata et al.

(10) Patent No.: US 12,543,205 B2
(45) Date of Patent: Feb. 3, 2026

(54) COMMUNICATION SYSTEM AND COMMUNICATION METHOD PERFORMING RESOURCE ALLOCATION PROCESSING IN CONSIDERATION OF HIGH SPEED, LARGE CAPACITY, HIGH RELIABILITY, OR LOW LATENCY

(71) Applicant: KABUSHIKI KAISHA TOSHIBA, Tokyo (JP)

(72) Inventors: Haruka Obata, Tokyo (JP); Toshihisa Nabetani, Kanagawa (JP); Kabuto Arai, Kanagawa (JP); Kosuke Tatsumura, Kanagawa (JP); Hayato Goto, Kanagawa (JP); Yoshisato Sakai, Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 359 days.

(21) Appl. No.: 18/181,789

(22) Filed: Mar. 10, 2023

(65) Prior Publication Data
US 2024/0040599 A1     Feb. 1, 2024

(30) Foreign Application Priority Data
Jul. 26, 2022   (JP) ................................. 2022-118797

(51) Int. Cl.
*H04W 72/50*   (2023.01)
*H04W 72/54*   (2023.01)

(52) U.S. Cl.
CPC ......... *H04W 72/535* (2023.01); *H04W 72/54* (2023.01)

(58) Field of Classification Search
CPC . H04W 72/535; H04W 72/54; H04W 72/512; H04W 72/29; H04W 72/20
See application file for complete search history.

(56) References Cited

U.S. PATENT DOCUMENTS

| 12,058,679 B2* | 8/2024 | Lee | H04L 5/0091 |
| 2018/0192294 A1* | 7/2018 | Gilbert | H04W 8/04 |

(Continued)

FOREIGN PATENT DOCUMENTS

| EP | 3793248 A1 | 3/2021 |
| JP | 2021523636 A | 9/2021 |
| JP | 2023123991 A | 9/2023 |

OTHER PUBLICATIONS

Hanakago, et al., "A Study on Inter-Cluster Interference Coordination for Distributed Antenna Network Using Quantum Computing", IEICE Technical Report (vol. 121, No. 103, RCS2021-77), Jul. 2021, pp. 1-6.

(Continued)

*Primary Examiner* — Asad M Nawaz
*Assistant Examiner* — Michael Wayne Maddox
(74) *Attorney, Agent, or Firm* — Holtz, Holtz & Volek PC

(57) ABSTRACT

According to one embodiment, a communication system includes a base station based on a communication standard and an allocation information generation device from the base station. The allocation information generation device comprises first and second generators. The first and the second generators output first and second allocation information until a first time elapses after an allocation request is received. The allocation information generation device transmits, to the base station, one of the first and the second allocation information which satisfies a constraint defined by the communication standard.

27 Claims, 17 Drawing Sheets

(56) References Cited

U.S. PATENT DOCUMENTS

| | | | | |
|---|---|---|---|---|
| 2020/0337048 | A1* | 10/2020 | Abedini | H04W 72/23 |
| 2021/0029674 | A1* | 1/2021 | Uchiyama | H04W 72/20 |
| 2021/0274536 | A1* | 9/2021 | Shin | H04W 72/535 |
| 2021/0400655 | A1* | 12/2021 | Fong | H04W 72/20 |
| 2022/0141154 | A1* | 5/2022 | Agardh | G06F 9/505 |
| | | | | 709/226 |
| 2022/0150915 | A1* | 5/2022 | Terabe | H04W 72/52 |
| 2022/0225334 | A1* | 7/2022 | Xu | H04W 28/0925 |
| 2022/0386302 | A1* | 12/2022 | Radunovic | H04W 72/1263 |
| 2022/0417948 | A1* | 12/2022 | Balasingam | H04W 72/54 |
| 2023/0276467 | A1 | 8/2023 | Obata et al. | |

OTHER PUBLICATIONS

Japanese Office Action (and an English language translation thereof) dated Jul. 15, 2025, issued in counterpart Japanese Application No. 2022-118797.

* cited by examiner

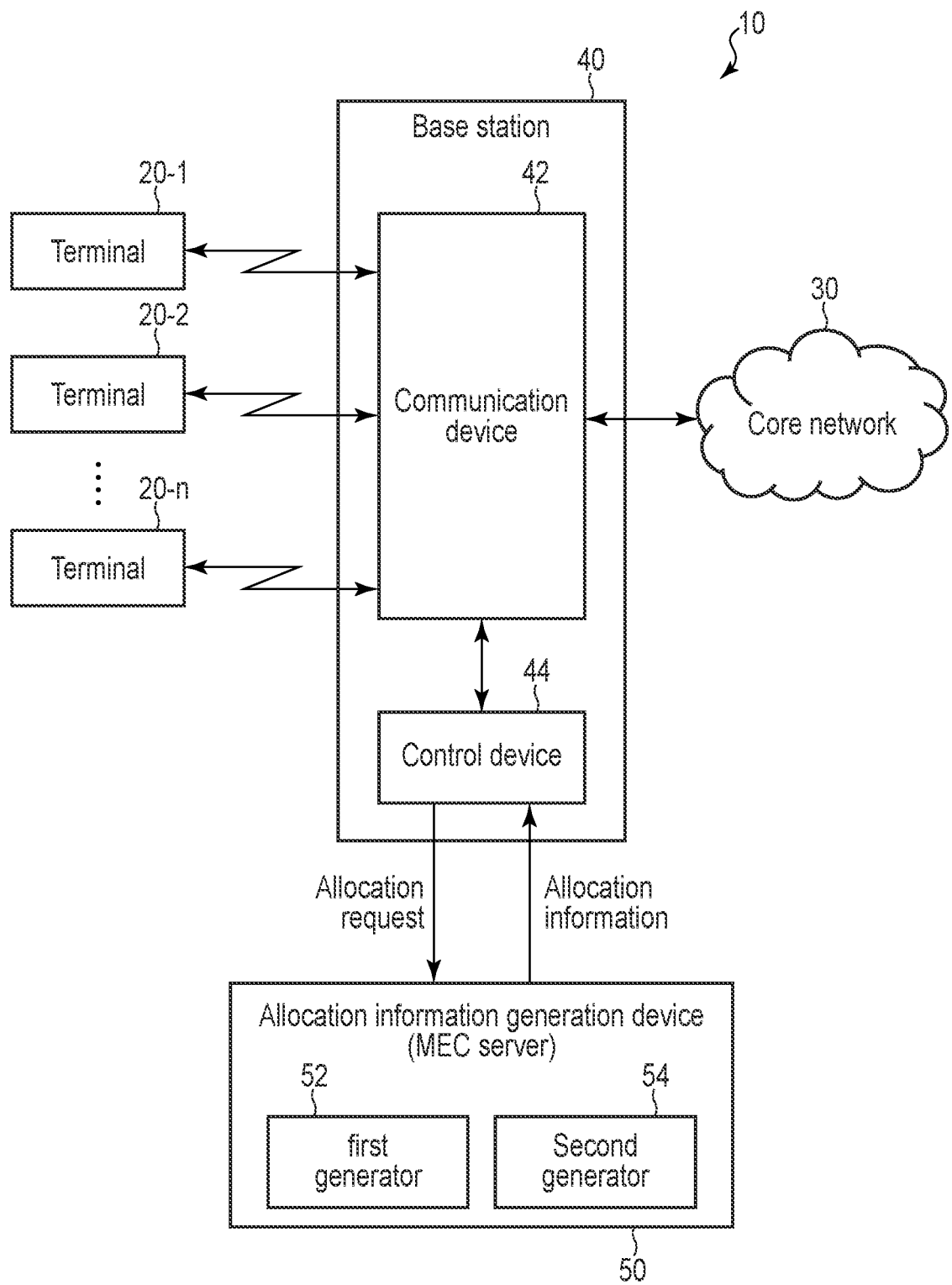
F I G. 1

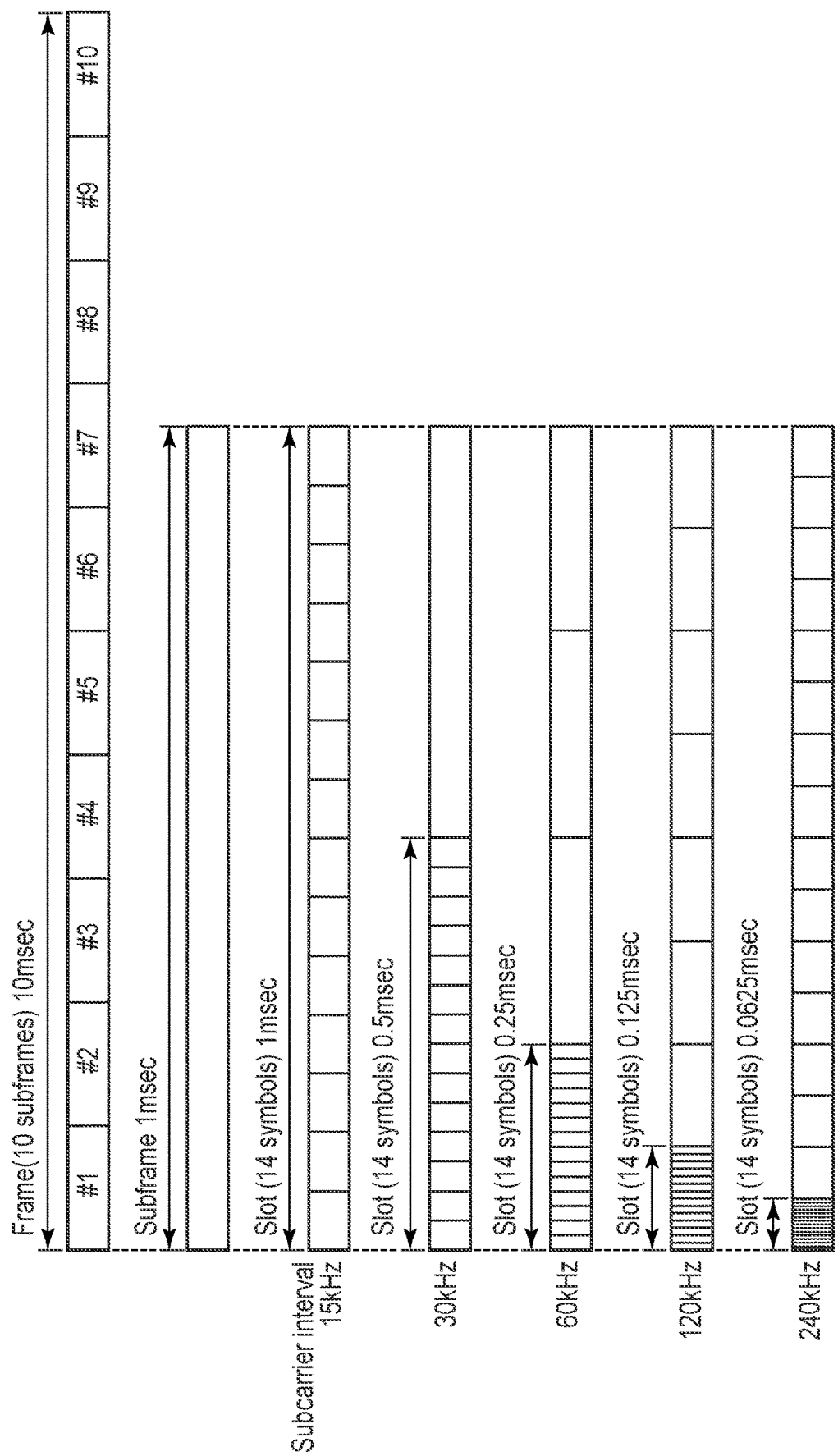
F I G. 4

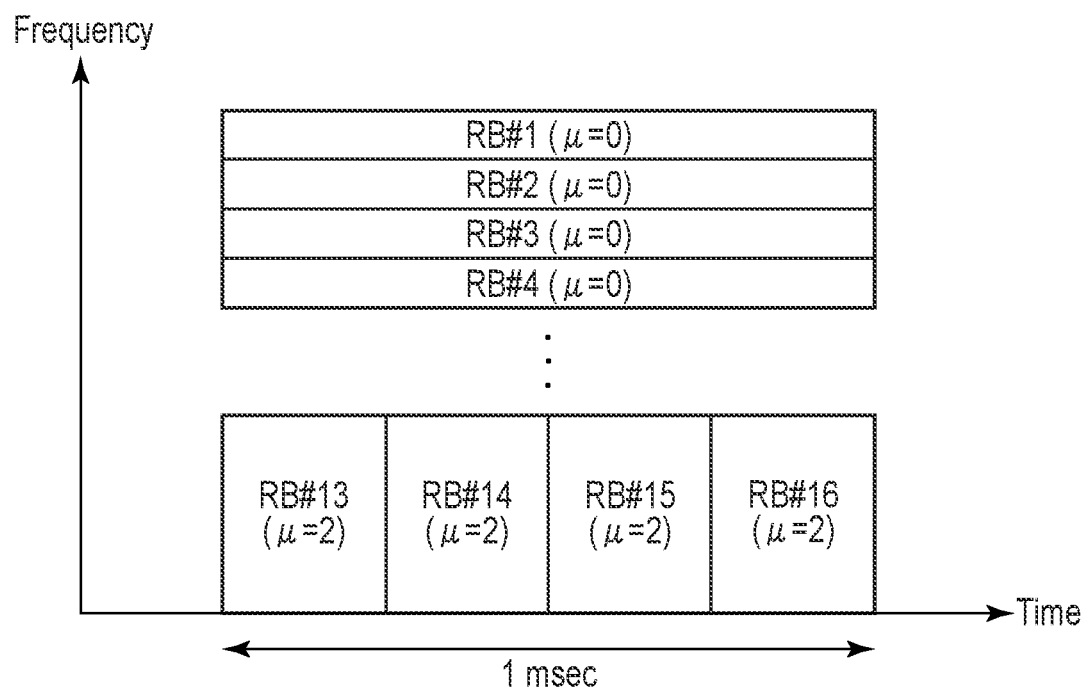
F I G. 7
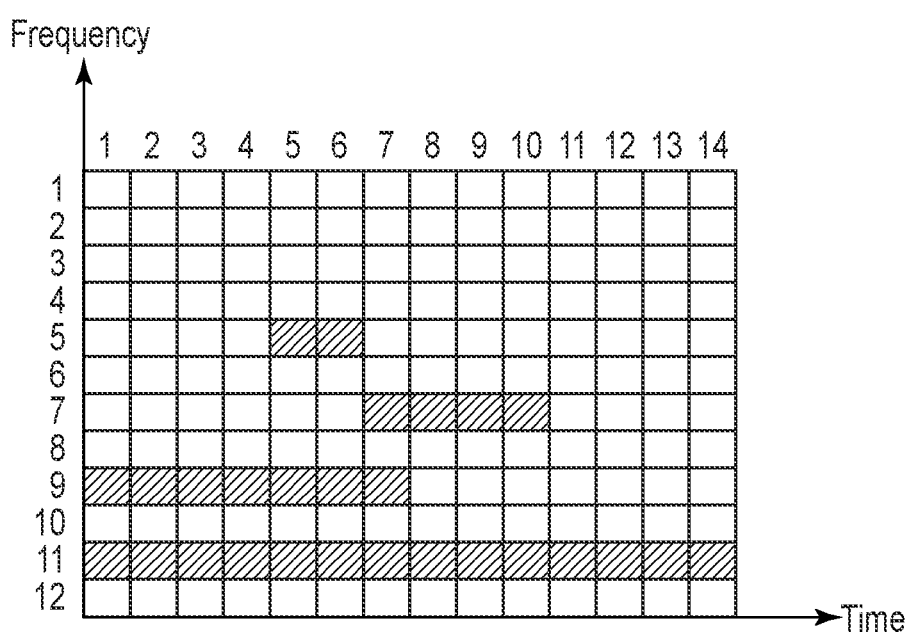
F I G. 8

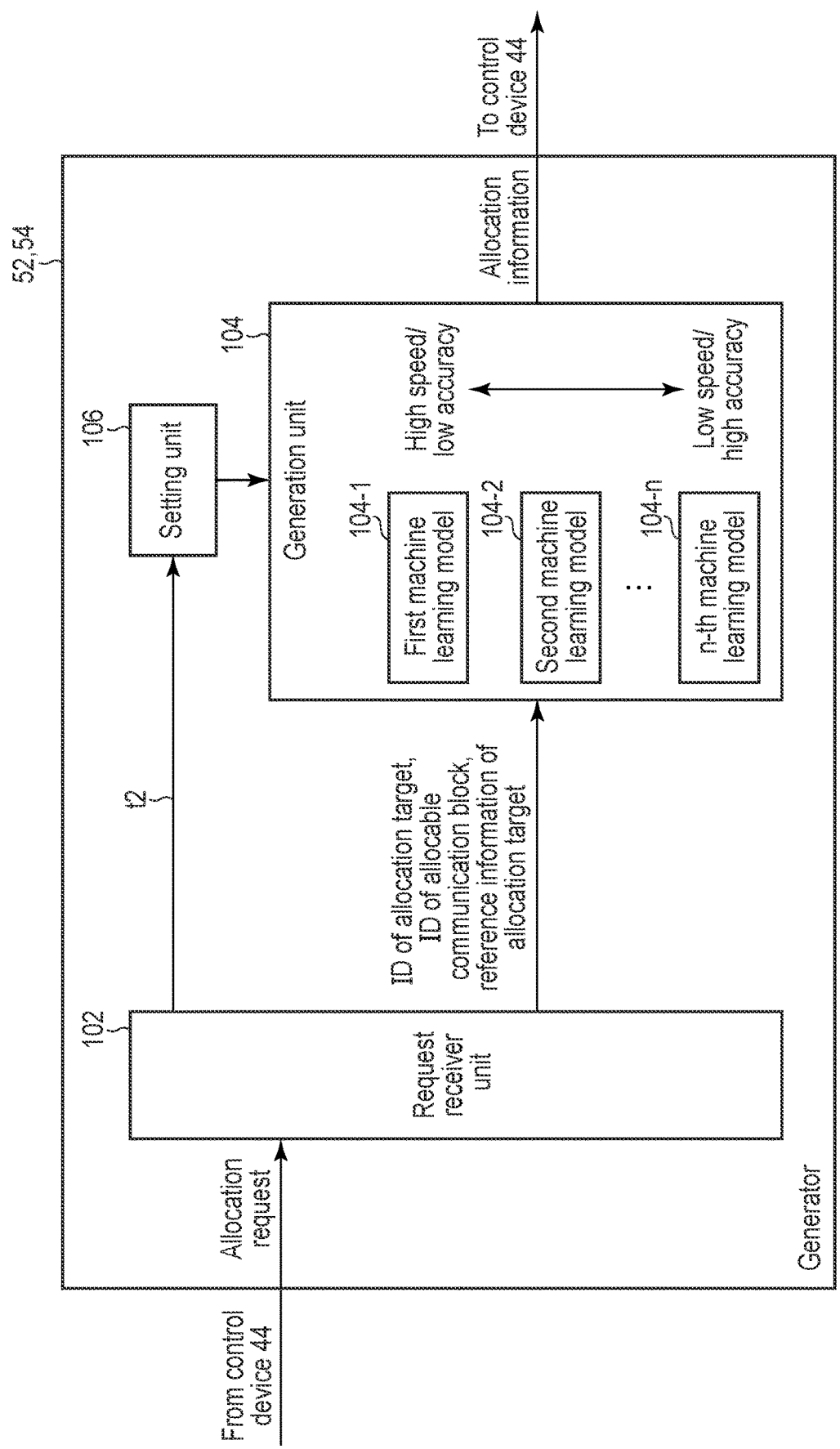
F I G. 16

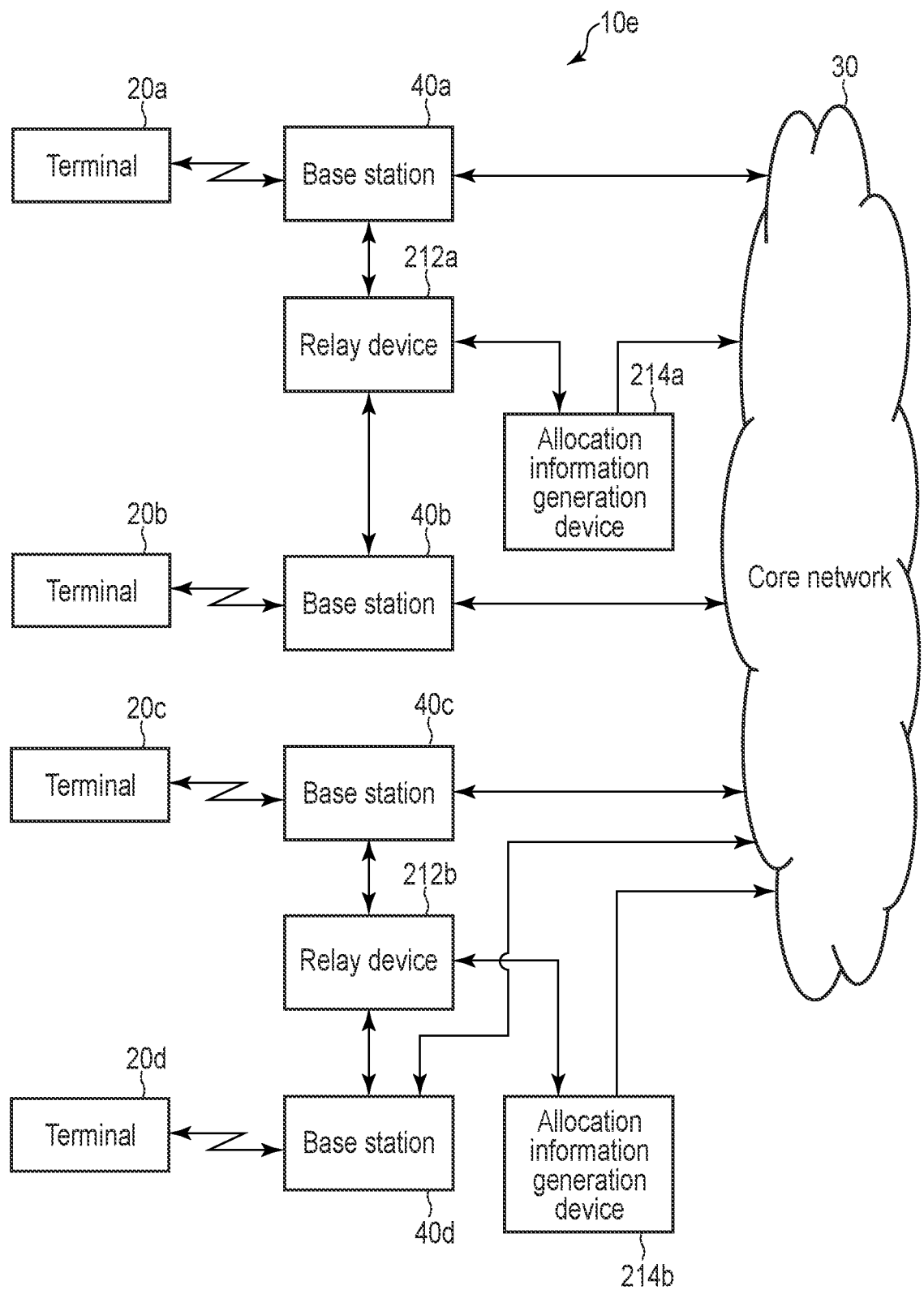
F I G. 22

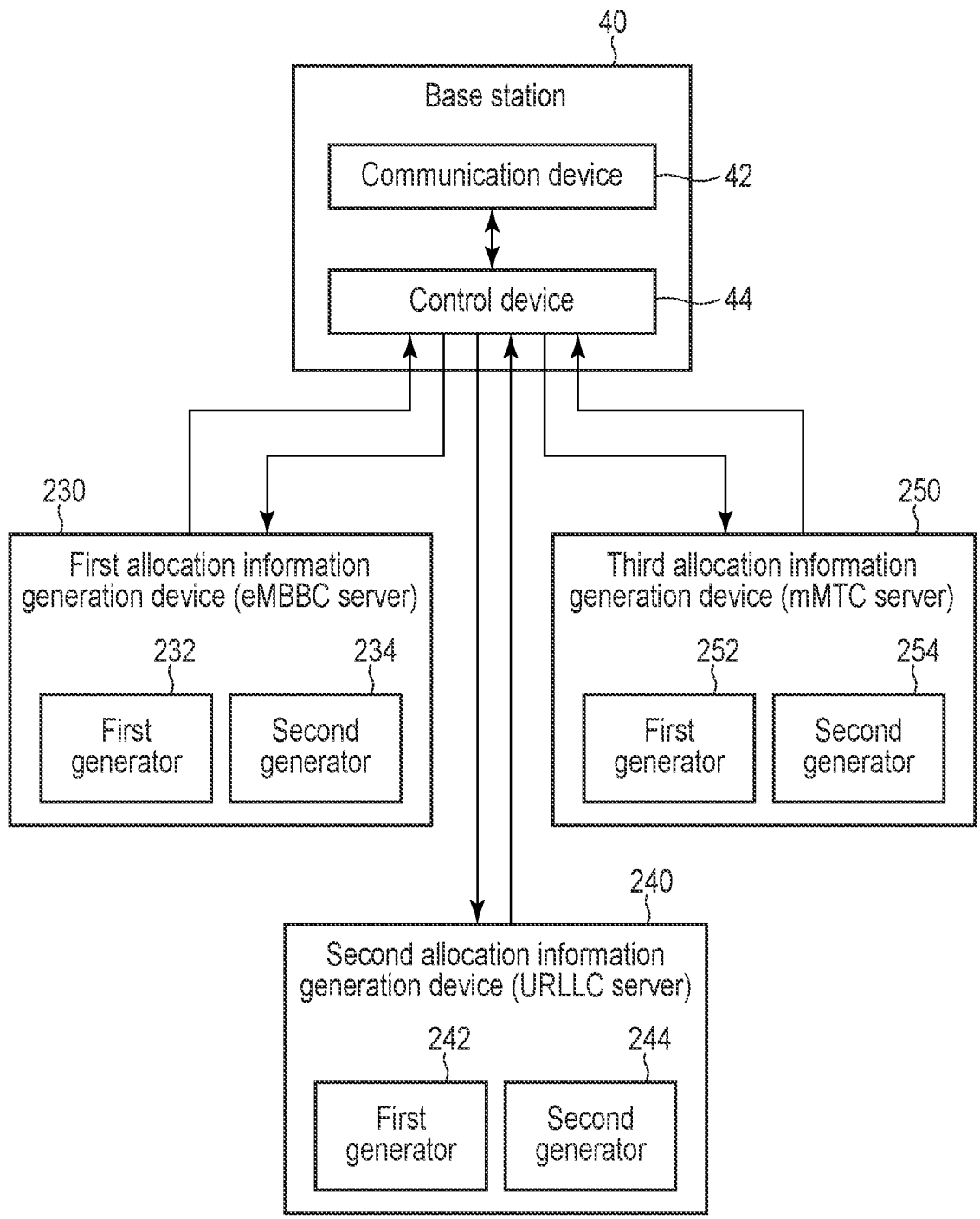
F I G. 24

COMMUNICATION SYSTEM AND COMMUNICATION METHOD PERFORMING RESOURCE ALLOCATION PROCESSING IN CONSIDERATION OF HIGH SPEED, LARGE CAPACITY, HIGH RELIABILITY, OR LOW LATENCY

CROSS-REFERENCE TO RELATED APPLICATIONS

This application is based upon and claims the benefit of priority from Japanese Patent Application No. 2022-118797, filed Jul. 26, 2022, the entire contents of which are incorporated herein by reference.

FIELD

Embodiments described herein relate generally to a communication system and a communication method.

BACKGROUND

In a wireless communication system, a large number of terminals simultaneously perform communication. The wireless communication system includes a resource allocation device that allocates resources for communication to each of the terminals. The terminal that is to start wireless communication transmits an allocation request to the resource allocation device. The resource allocation device allocates resources to the terminals that have transmitted the allocation requests, and transmits resource allocation results to the terminals. Each terminal performs wireless communication by using the allocated resources.

The wireless communication system is required to meet various requirements such as high speed, large capacity, high reliability, and low latency. The resource allocation device is required to perform resource allocation processing in consideration of these requirements.

BRIEF DESCRIPTION OF THE DRAWINGS

FIG. 1 is a diagram for explaining an example of a communication system according to an embodiment.

FIG. 4 is a diagram for explaining an example of a frame configuration of a modulation signal of a 5G system.

FIG. 7 is a diagram for explaining a third example of the resource block according to the embodiment.

FIG. 8 is a diagram for explaining an example of the resource block and an allocation example of a mini-slot according to the embodiment.

FIG. 16 is a diagram for explaining an example of the first generator and the second generator according to the embodiment.

FIG. 22 is a diagram for explaining an example of a communication system according to a fifth modification of the embodiment.

FIG. 24 is a diagram for explaining another modification example of an allocation information generating device.

DETAILED DESCRIPTION

Figure 2:
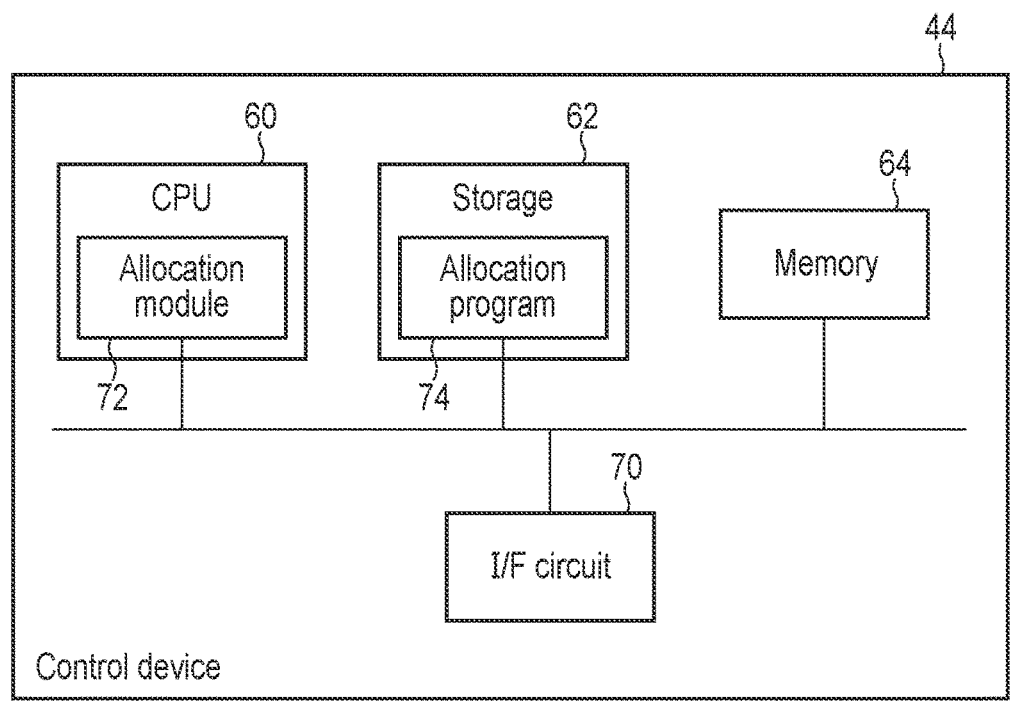
FIG. 2 is a diagram for explaining an example of a control device according to the embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a communication system comprising:
  a base station configured to perform communication based on a communication standard with respect to a terminal; and
  an allocation information generation device configured to receive an allocation request from the base station and determine a resource used for the communication, wherein
  the allocation information generation device comprises a first generator configured to perform a first processing and a second generator configured to perform a second processing different from the first processing;

the first generator is configured to output first allocation information until a first time elapses after the allocation request is received;

the second generator is configured to output second allocation information until the first time elapses after the allocation request is received;

in a case where one of the first allocation information and the second allocation information satisfies a constraint defined by the communication standard, the allocation information generation device transmits, to the base station, one of the first allocation information and the second allocation information, which satisfies the constraint; and the base station is configured to communicate with the terminal by using resources corresponding to the first allocation information or the second allocation information, which is transmitted from the allocation information generation device.

FIG. 1 is a diagram for explaining an example of a communication system 10 according to an embodiment. An example of the communication system includes a wireless LAN based on the IEEE 802.11 standard, a third generation mobile communication system (3G system) standardized in Third Generation Partnership Project (3GPP) (registered trademark), a fourth generation mobile communication system (4G system or LTE-Advanced), and a fifth generation mobile communication system (5G system). The 5G mobile communication system will be described as the communication system 10 according to the embodiment. As the communication system 10, a sixth generation mobile communication system (6G system) for which standardization is being studied in 3GPP may be used.

In the 5G system, it is assumed that services required to meet various requirements such as high speed and large capacity, low latency, multiple simultaneous connection, high reliability, and fairness are mixed. Efficient resource utilization is important to meet these various requirements.

Examples of the resources include a frequency, a time, a space (spatial stream), power, a code, orbital angular momentum, and the like. The communication system includes an allocation apparatus that allocates resources to each of the terminals. It is required to execute the resource allocation processing in a very short time.

In the 5G system, wireless communication is performed between the terminal and a base station by using a modulation signal modulated by orthogonal frequency division multiplexing (OFDM) modulation. The modulation signal is a signal with which a subcarrier interval can be changed by using a mixed-numerology scheme. In the 5G system, a unit called a slot is defined. The slot includes a predetermined number (for example, 14) of OFDM symbols. Therefore, a time length of the slot can be changed with the modulation signal adopting the mixed-numerology scheme.

In the 5G system, a unit called a resource element is defined. The resource element is formed by one subcarrier and one OFDM symbol. Each of a plurality of the resource elements is specified by a subcarrier position and a symbol position. The subcarrier position indicates a position of the modulation signal in a frequency direction. The symbol position indicates a position of the modulation signal in a time direction. One resource block includes a plurality of resource elements (for example, 12 subcarriers×14 OFDM symbols=168 resource elements). In the 5G system, a unit called a resource block group is also defined. The resource block group is formed by collecting a plurality of resource blocks.

In the 5G system, a massive multiple-input and multiple-output (MIMO) scheme is used. In the massive MIMO scheme, a plurality of antennas are used in both transmission and reception.

The communication system 10 includes a core network 30 and a base station 40. FIG. 1 illustrates the communications system 10 that includes a single base station 40. However, the communication system 10 may include a plurality of the base stations 40.

The core network 30 is a backbone communication network in the 5G system. The core network 30 relays packet communication between the base station 40 and other networks or packet communication between a plurality of the base stations 40.

At least one of terminals 20-1, 20-2, . . . and 20-$n$ is connected to the base station 40. In a case where the terminals 20-1 to 20-$n$ are not distinguished, each of the terminals 20-1 to 20-$n$ is referred to as a terminal 20.

The terminal 20 may be an information processing device having a wireless communication function. The terminal 20 includes an antenna. The terminal 20 is owned by a user. A unique identification number is assigned to the terminal 20. The terminal 20 transmits and receives a modulation signal specified in the 5G system to and from the base station 40 by wireless communication. The terminal 20 may be portable by the user or may be installed in a specific place.

The base station 40 includes a communication device 42 and a control device 44. The communication device 42 is connected to the terminal 20 and the core network 30. The communication device 42 may be connected to the core network 30 via a signal line.

The base station 40 transmits and receives a 5G modulation signal to and from at least one terminal by wireless communication. The base station 40 relays packet communication between the at least one terminal 20 and the core network 30.

Under the control of the control device 44, the communication device 42 transmits and receives the 5G modulation signal to and from the at least one terminal 20 by wireless communication. The communication device 42 includes an antenna.

The control device 44 controls transmission and reception of the modulation signal in at least one terminal 20 and the communication device 42. For example, the control device 44 executes allocation processing of allocating whether to transmit and receive data by using at least one communication block included in the modulation signal to at least one terminal to be allocated among at least one terminal 20. At least one communication block is specified by a position of the modulation signal in a frequency direction and a position of the modulation signal in a time direction. The communication block may be a resource block group, a resource block, or a resource element.

The control device 44 may allocate a resource block group, a resource block, or any resource element in the resource block to the terminal 20 to be allocated (hereinafter, referred to as an allocation target terminal).

In the allocation processing, the control device 44 may designate the subcarrier interval for at least one communication block included in the modulation signal. In the allocation processing, the control device 44 may designate an orthogonal modulation scheme, transmission power, or a coding rate for data included in at least one communication block. In the allocation processing, the control device 44 may designate a propagation channel matrix used in the massive MIMO scheme for the allocation target terminal.

The allocation information generation device 50 is connected to the base station 40. The allocation information generation device 50 disposed near the base station 40 is also referred to as a mobile edge computing (MEC) server. The allocation information generation device 50 may be disposed in the base station 40. The allocation information generation device 50 is connected to the core network 30. The allocation information generation device 50 connected to the core network 30 is also referred to as a remote server. The allocation information generation device is connected to the control device 44.

The control device 44 outputs an allocation request to the allocation information generation device 50 before performing the allocation processing. In a wireless system, resource allocation needs to be performed within a fixed time. An example of the fixed time is one slot which is a minimum unit of scheduling (allocation processing) time. The fixed time may be represented by a time. The allocation information generation device 50 outputs allocation information. The allocation information indicates a resource allocation result to the control device 44 within one slot after receiving the allocation request.

There may be many evaluation methods for evaluating whether the allocation result obtained by the allocation information generation device 50 is good or bad. For example, an evaluation value is given to the allocation result by an evaluation expression. An example of the evaluation expression is represented by one of transmission efficiency, a latency time (an average latency time or a worst latency time), inter-terminal fairness, a latency achievement rate, and the like in the core network 30 or a combination thereof. The highly evaluated allocation result realizes communication with high transmission efficiency, a short latency time, high fairness, and a high latency achievement rate. The evaluation expression may be represented by the weighted transmission efficiency, latency time, inter-terminal fairness, and latency achievement rate.

In a case where the base station 40 is operated in a policy that is required to maximize a system throughput, the evaluation method is performed with the throughput. The evaluation value of the throughput is the sum of the throughput of the user, which is expected in a case where the wireless communication is performed according to the allocation result (that is, the expected system throughput). The expected system throughput is a throughput in a case where a signal is not erroneously transmitted when the signal is transmitted according to the allocation result. In this case, the greater the evaluation value, the higher the evaluation for the allocation result.

In a case where the base station 40 is operated in a policy required to reduce the average latency time, the evaluation method is performed with the average latency time. The evaluation value of the average latency time is an average value of the latency time of each user when a signal is transmitted according to the allocation result. In this case, the smaller the evaluation value, the higher the evaluation for the allocation result. In a case where the evaluation value includes a negative value and a positive value, the greater the negative value, the higher the evaluation for the allocation result.

In a case where the base station 40 is operated in a policy that emphasizes instantaneous fairness, the evaluation method is performed with the fairness. The evaluation value of the fairness is a variation (variance) in throughput between users when a signal is transmitted according to the allocation result. In this case, the smaller the evaluation value, the higher the evaluation for the allocation result.

In a case where the base station 40 is operated in a policy required to increase the latency achievement rate, the evaluation method is performed with the latency achievement rate. The evaluation value of the latency achievement rate is expressed by (number of packets arriving within request latency time among received packets)/(number of received packets) with respect to a physical layer, and the greater the evaluation value (Maximum 1), the higher the evaluation for the allocation result. The evaluation value of the latency achievement rate may be expressed by (number of transport blocks (TBs) arriving within required latency time among TBs generated by base station)/(number of TBs generated by base station). The evaluation value of the latency achievement rate may be expressed by a data unit arriving within the required latency time with respect to an application layer.

The allocation information generation device 50 needs to transmit allocation information to the control device 44 within a fixed time after receiving the allocation request. It is difficult to always obtain an optimum allocation result within a fixed time of a short time (for example, equal to or less than 1 msec).

The allocation result used by the base station 40 needs to satisfy a constraint defined by the communication standard. For example, in the 5G system, there is a constraint that a plurality of the terminals do not use the same resources at the same time. In the system, resources allocated to one terminal may be discontinuous on a frequency axis, but there may be a constraint that the resources need to be continuous on a time axis.

In order to obtain the allocation result of the high evaluation, generally, a calculation amount increases and a calculation time increases. Therefore, when the allocation information generation device 50 tries to obtain the allocation result of the high evaluation, there is a possibility that the allocation result satisfying the constraint cannot be obtained within the fixed time. On the other hand, the allocation result of low evaluation is likely to be obtained in a short time with a small calculation amount. However, when communication is performed according to the allocation result of the low evaluation, transmission efficiency is low or a latency time is long.

The allocation information generation device 50 includes two generators (a first generator 52 and a second generator 54). The first generator 52 and the second generator 54 perform different allocation determination processing. The first generator 52 obtains a first allocation result. The second generator 54 obtains a second allocation result. The degree of evaluation for the first allocation result is different from the degree of evaluation for the second allocation result. The possibility that the first allocation result satisfies the constraint is different from the possibility that the second allocation result satisfies the constraint. For example, the first allocation result is highly evaluated, but is less likely to satisfy the constraint. The second allocation result is low evaluated, but is likely to satisfy the constraint. The first generator 52 and the second generator 54 may be implemented as separate devices, or may be implemented in the same apparatus.

In order to obtain a highly evaluated allocation result, it is necessary to widen a search range of the allocation result of the first generator 52. Therefore, the calculation time for obtaining the first allocation result increases. The first generator 52 may fully search the combinations of all the obtainable allocation results. The first generator 52 may obtain the allocation result by using machine learning. The first generator 52 may obtain the allocation result by using quantum computing or the like.

The second generator 54 sequentially allocates resources for each terminal 20. In this case, since it does not cause a combination problem, the allocation satisfying a certain constraint is performed. However, when the highly evaluated resources are allocated to a terminal to which the resources are allocated first, a terminal to which the resources are allocated later does not have a right to select the resources, and only the low evaluated resources can be allocated to the terminal to which the resources are allocated later. Therefore, the entire allocation result of the terminal 20 may be evaluated lower. The order of the terminals 20 to which the second generator 54 allocates the resources may be determined based on the order of identification information of the terminals 20, the past transmission data amount, a channel usage status, a latency request, the transmission data amount of a buffer, and the like.

The control device 44 acquires first allocation information from the first generator 52, acquires second allocation information from the second generator 54, and determines whether or not the first allocation information and the second allocation information satisfy the constraint. The control device 44 selects the first allocation information or second allocation information which satisfies the constraint. In a case where both the first allocation information and the second allocation information satisfy the constraint, the control device 44 selects the first allocation information or second allocation information which is highly evaluated.

The control device 44 executes allocation processing by using the selected allocation information. The control device 44 causes the terminal 20 and the communication device 42 to transmit and receive a modulation signal according to the allocation processing result.

FIG. 2 is a diagram for explaining an example of the control device 44. The control device 44 includes a CPU 60, a storage 62, a memory 64, and a server I/F circuit 70. The storage 62 stores an application to be executed by the CPU 60. An example of the application is an allocation program 74. Examples of the storage 62 include a hard disk and an SSD (solid state drive). The CPU 60 reads the application from the storage 62, writes the application in the memory 64, and executes the application stored in the memory 64. Examples of the memory 64 include a DRAM and an SRAM. The CPU 60 functions as an allocation module 72 by executing the allocation program 74. The server I/F circuit 70 performs communication with the allocation information generation device 50. The control device 44 may be formed by a circuit such as an application specific integrated circuit (ASIC) or a field programmable gate array (FPGA).

Figure 3:
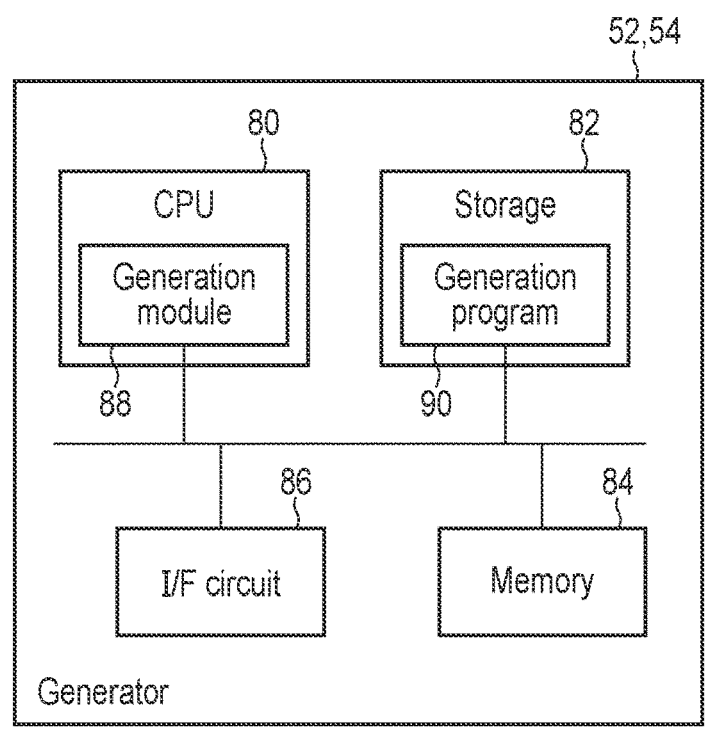
FIG. 3 is a diagram for explaining an example of a first generator and a second generator according to the embodiment.

FIG. 3 is a diagram for explaining an example of the first generator 52 and the second generator 54. Each of the first generator 52 and the second generator 54 includes a CPU 80, a storage 82, a memory 84, and a base station I/F circuit 86. The storage 82 stores an application executed by the CPU 80. An example of the application is a generation program 90. Examples of the storage 82 include a hard disk and an SSD. The CPU 80 reads the application from the storage 82, writes the application in the memory 84, and executes the application stored in the memory 84. Examples of the memory 84 include a DRAM and an SRAM. The CPU 80 functions as a generation module 88 by executing the allocation determination program 90. The base station I/F circuit 86 performs communication with the control device 44. The first generator 52 and the second generator 54 may be formed by a circuit such as an application specific integrated circuit (ASIC) or a field programmable gate array (FPGA).

FIG. 4 is a diagram for explaining an example of a frame configuration of a modulation signal of the 5G system.

In the 5G system, a frame having a predetermined time length is defined. The time length of the frame is 10 msec. One frame includes 10 subframes each having a predetermined time length. The time length of each of the subframes is 1 msec.

In the 5G system, five types of subcarrier intervals of 15 kHz ($\mu=0$), 30 kHz ($\mu=1$), 60 kHz ($\mu=2$), 120 kHz ($\mu=3$), and 240 kHz ($\mu=5$) are defined. $\mu$ is a value for identifying the subcarrier interval.

In the 5G system, a unit called a slot is defined. The slot includes 14 OFDM symbols. Each of the OFDM symbols have a different time length depending on the subcarrier interval. Therefore, the time length of the slot varies depending on the subcarrier interval.

One subframe includes at least one slot. In a case where the subcarrier interval is set to 15 kHz, one subframe includes one slot. In a case where the subcarrier interval is set to 30 kHz, one subframe includes two slots. In a case where the subcarrier interval is set to 60 kHz, one subframe includes four slots. In a case where the subcarrier interval is set to 120 kHz, one subframe includes eight slots. In a case where the subcarrier interval is set to 240 kHz, one subframe includes 16 slots.

In a case where the subcarrier interval is narrow, the time length of the slot is long, a multipath communication performance is good, and the latency amount is great. In a case where the subcarrier interval is 15 kHz, the time length of the slot is 1 msec, a multipath communication performance is good, and the latency amount is great. The wider the subcarrier interval, the shorter the time length of the slot. The latency amount is small, but communication is likely to be affected by inter symbol interference (ISI). In a case where the subcarrier interval is 240 kHz, the time length of the slot is 0.0625 msec. The latency amount is small, but communication is likely to be affected by the ISI.

In a case where the terminal 20 moves at a low speed and transmits and receives data having a large allowable latency time, the control device 44 may allocate a resource block having narrow subcarrier interval to the terminal 20. The control device 44 may allocate a resource element included in the resource block having narrow subcarrier interval to the terminal 20.

In a case where the terminal 20 moves at a high speed and transmits and receives data having a short allowable latency time, the control device 44 may allocate a resource block having wide subcarrier interval to the terminal 20. The control device 44 may allocate a resource element included in the resource block having wide subcarrier interval to the terminal 20.

Therefore, in the 5G system, a wider subcarrier than that of the 4G system can be used, and the slot time is shortened.

Figure 5:
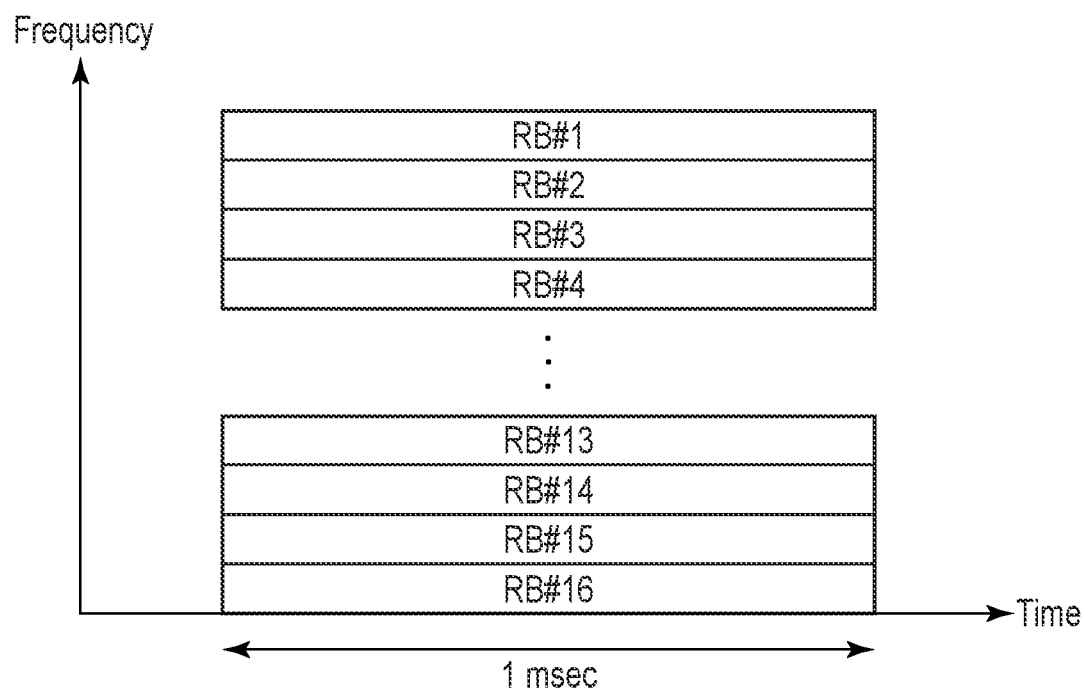
FIG. 5 is a diagram for explaining a first example of a resource block according to the embodiment.

FIG. 5 is a diagram for explaining a first arrangement example of a resource block RB. The resource block RB includes one slot (14 OFDM symbols) in the time direction and a predetermined number (for example, 12) of subcarriers in the frequency direction.

In the modulation signal of the 5G system, a plurality of the resource blocks RB are grouped into one resource block group. For example, in a case where a band of 100 MHz is used, one subframe includes 17 resource block groups.

For example, in a case where 16 resource blocks are included in one subframe, the 16 resource blocks include one slot (14 OFDM symbols) and 192 (12×16) subcarriers.

As illustrated in FIG. 5, the control device 44 may allocate the greatest subcarrier interval of 15 kHz ($\mu=0$) to the subcarrier interval of the resource blocks in all the regions of the band. In this case, the allowable latency time is long, but the control device 44 can transmit and receive data by multipath to and from all of at least one terminal 20.

Figure 6:
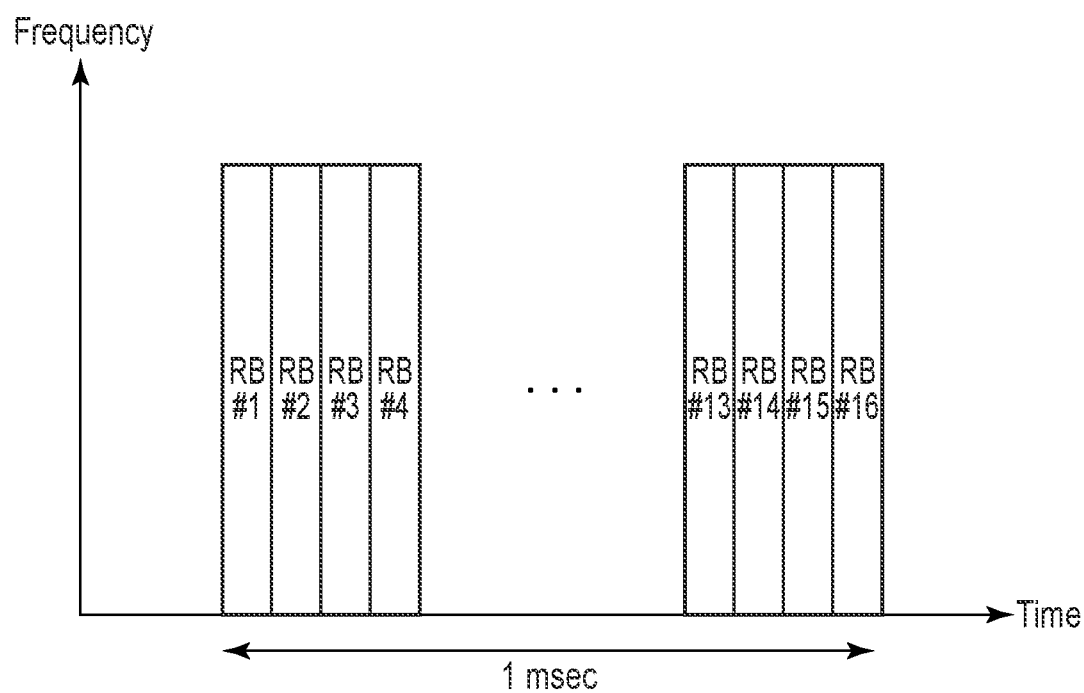
FIG. 6 is a diagram for explaining a second example of the resource block according to the embodiment.

FIG. 6 is a diagram for explaining a second arrangement example of a resource block RB. As illustrated in FIG. 6, the control device 44 may allocate the narrowest subcarrier interval of 240 kHz ($\mu=4$) to the subcarrier interval of the resource blocks in all the regions of the band. In this case, the control device 44 can transmit and receive data having a short allowable latency time to and from all of at least one terminal 20.

FIG. 7 is a diagram for explaining a third arrangement example of a resource block RB. As illustrated in FIG. 7, the control device 44 may divide the band into two areas, allocate the widest subcarrier interval of 15 kHz ($\mu=0$) to a subcarrier interval of a resource block in one area, and allocate subcarrier interval of 60 kHz ($\mu=2$) to a subcarrier interval of a resource block in the other area. In this case, the control device 44 can transmit and receive data by mixing, in the subframe, a terminal 20 that transmits and receives data required to have a high quality but a long latency time and a terminal 20 that transmits and receives data required to have a short allowable latency time and not to have a high quality.

The control device 44 can divide the band into a plurality of areas in this manner and allocate a different subcarrier interval to subcarrier interval of each of the resource blocks of a plurality of the areas. Therefore, the control device 44 can allocate a resource block having appropriate subcarrier interval to the terminal 20. It is possible to satisfy each request of the allocation target terminal 20.

FIG. 8 is a diagram for explaining a configuration example of a resource block RB and an allocation example of a mini-slot.

One resource block RB includes 14 OFDM symbols in the time direction and 12 subcarriers in the frequency direction. One resource block includes 168 (12×14) resource elements. Each of 168 resource elements can be specified by the subcarrier position and the symbol position.

In the 5G system, a unit called a mini-slot is defined. The mini-slot is formed by consecutive H OFDM symbols and one subcarrier. H is an integer of 2 or more, for example, 2, 4, 7, or 14. The control device 44 can allocate an arbitrary resource element in the resource block to the terminal 20 in units of mini-slots.

For example, by allocating the resource element to the terminal 20 in units of mini-slots and allocating the narrowest subcarrier interval of 240 kHz ($\mu=4$) to a subcarrier interval of the resource block including the mini-slot, the control device 44 can transmit and receive the data requesting an ultra-low latency to and from the terminal 20 to which the resource element is allocated.

Figure 9:
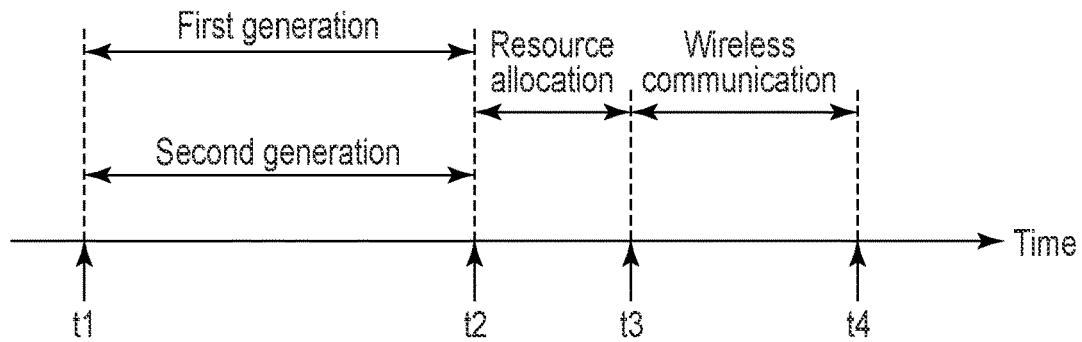
FIG. 9 is a diagram for explaining a timing of allocation processing according to the embodiment.

FIG. 9 is a diagram for explaining a timing of the allocation processing. Prior to execution of the allocation processing, the control device 44 selects an allocation target terminal at a first time t1 from at least one terminal 20. A second time t2 is a time later than the first time t1. The second time t2 is a time at which the allocation processing of allocating a communication block (resource block or resource element) after the second time t2 to the selected allocation target terminal is started.

The control device 44 determines to allocate which communication block after the second time t2 to the allocation target terminal at the first time t1 between the first time t1 and the second time t2.

The control device 44 transmits a first allocation request to the first generator 52 and transmits a second allocation request to the second generator 54. Until the second time t2, the control device 44 acquires first allocation information from the first generator 52 and acquires second allocation information from the second generator 54.

The control device 44 selects one of the first allocation information and the second allocation information, and starts the resource allocation processing based on the selected allocation information at the second time t2. The control device 44 causes the terminal 20 and the communication device 42 to transmit and receive a modulation signal according to the allocation processing result between a third time t3 at which the resource allocation processing is completed and a fourth time t4. The control device 44 may start the allocation processing before the second time t2, and cause the terminal 20 and the communication device 42 to transmit and receive the modulation signal according to the allocation processing result.

Figure 10:
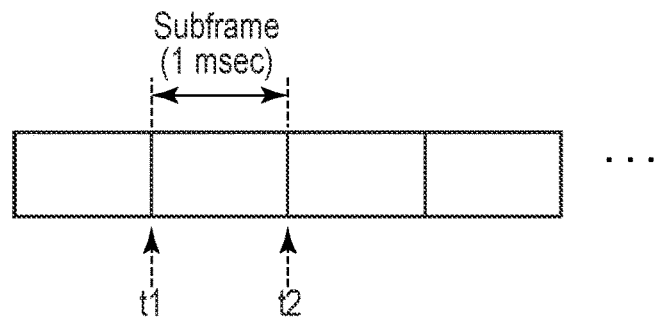
FIG. 10 is a diagram for explaining a first setting example of a first time and a second time according to the embodiment.

FIG. 10 is a diagram for explaining a first setting example of the first time t1 and the second time t2.

The first time t1 and the second time t2 are times determined in advance by scheduling. In a case where the control device 44 executes the allocation processing for predetermined subframes, the first time t1 is a time before the predetermined subframes to be subjected to the allocation processing. The first time t1 may be a start time of the subframe, or may be a time shifted a predetermined time before or after the start time of the subframe. In a case where the control device 44 executes the allocation processing for predetermined subframes, the second time t2 may be a start time of the predetermined subframes to be allocated or may be a time before the start time of the predetermined subframes to be allocated. The control device 44 may execute the allocation processing for each slot. In this case, a difference between the first time t1 and the second time t2 is one slot.

The first time t1 and the second time t2 may be times asynchronous with the subframe. For example, the first time t1 and the second time t2 may be times set when a predetermined event occurs. The control device 44 may determine that a time when a predetermined amount or more of downlink data is accumulated in the communication device 42 or a time when a predetermined amount or more of reservation requests for allocation is accumulated is the first time t1.

In a case where the time when a predetermined event occurs is set to the first time t1, the control device 44 may set a time after a predetermined time from the first time t1 to the second time t2. In a case where the time when the predetermined event occurs is set to the first time t1, the control device 44 may set a start time of the subframe immediately after the first time t1 to the second time t2, or set a time a predetermined time before the start time of the subframe immediately after the first time t1 to the second time t2

Figure 11:
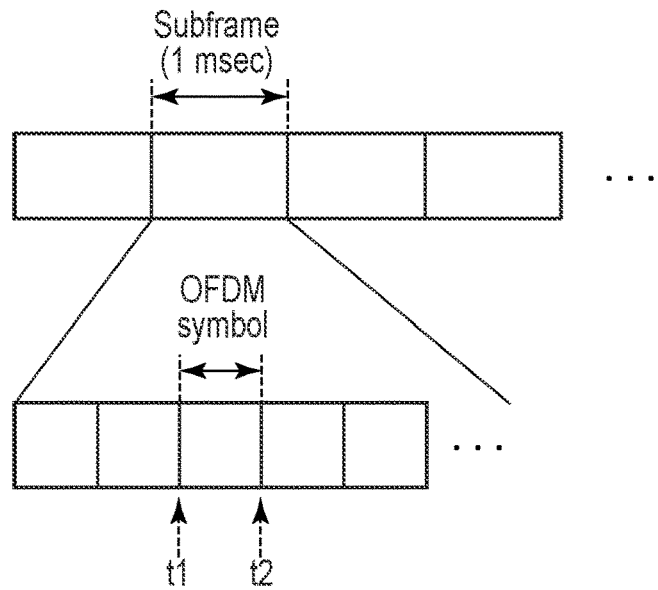
FIG. 11 is a diagram for explaining a second setting example of the first time and the second time according to the embodiment.

FIG. 11 is a diagram for explaining a second setting example of the first time t1 and the second time t2.

The control device 44 can allocate the resource element in units of mini-slots to the terminal 20 that transmits and receives data. In this case, the control device 44 may set a difference between the first time t1 and the second time t2 to the minimum time length of the OFDM symbol. The minimum time length of the OFDM symbol is a time length of the OFDM symbol with the narrowest subcarrier interval of 240 kHz ($\mu=4$).

The control device 44 may change a difference between the first time t1 and the second time t2. The control device 44 may determine the second time t2 according to the allowable latency time of data transmitted and received by the allocation target terminal. For example, the control device 44 may shorten the difference between the first time t1 and the second time t2 as the allowable latency time is shorter. Therefore, the control device 44 can transmit and receive data at an earlier time as the allowable latency time of the data is shorter.

Figure 12:
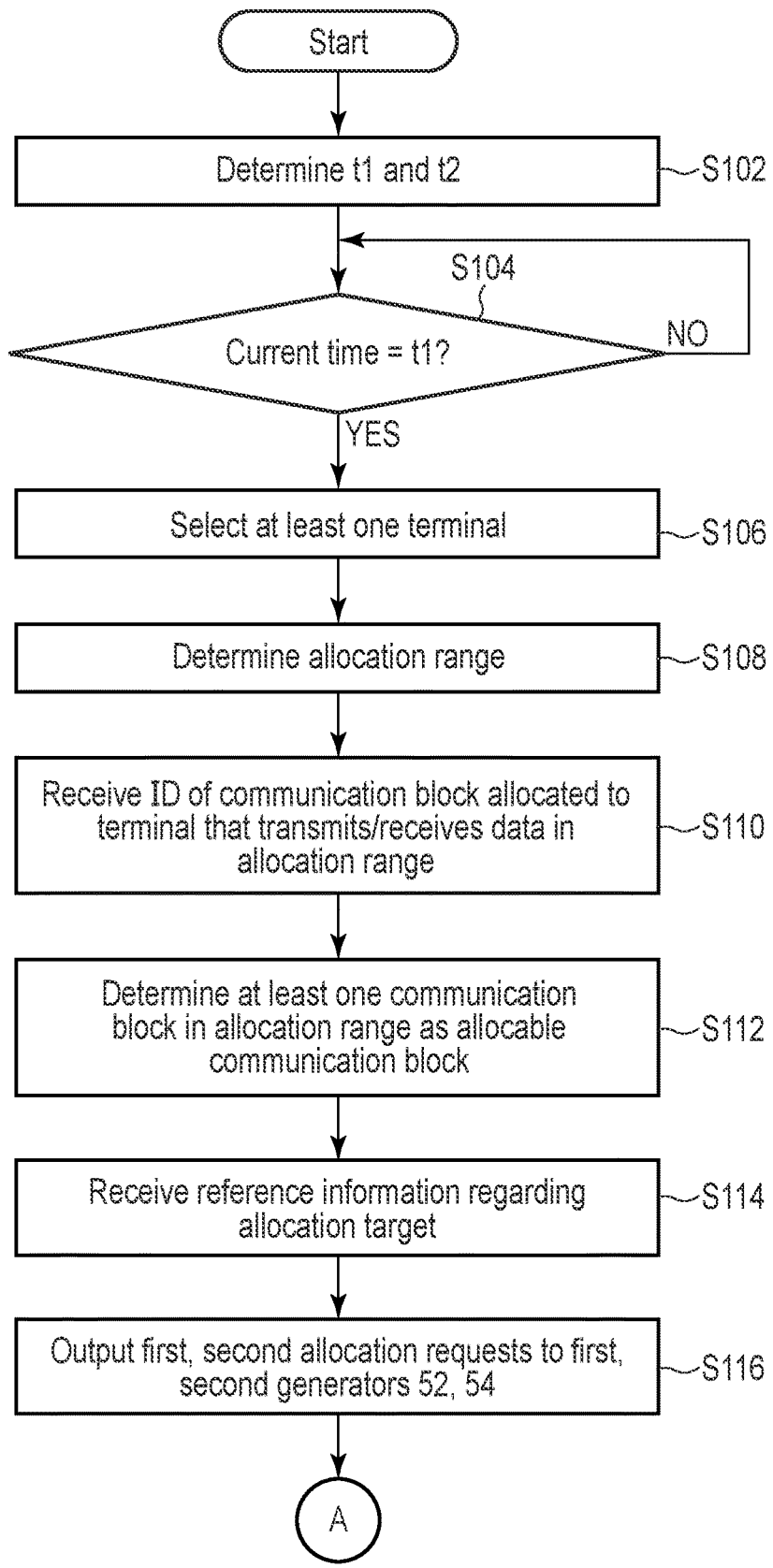
FIG. 12 is a flowchart for explaining an example of processing of the control device according to the embodiment.
Figure 13:
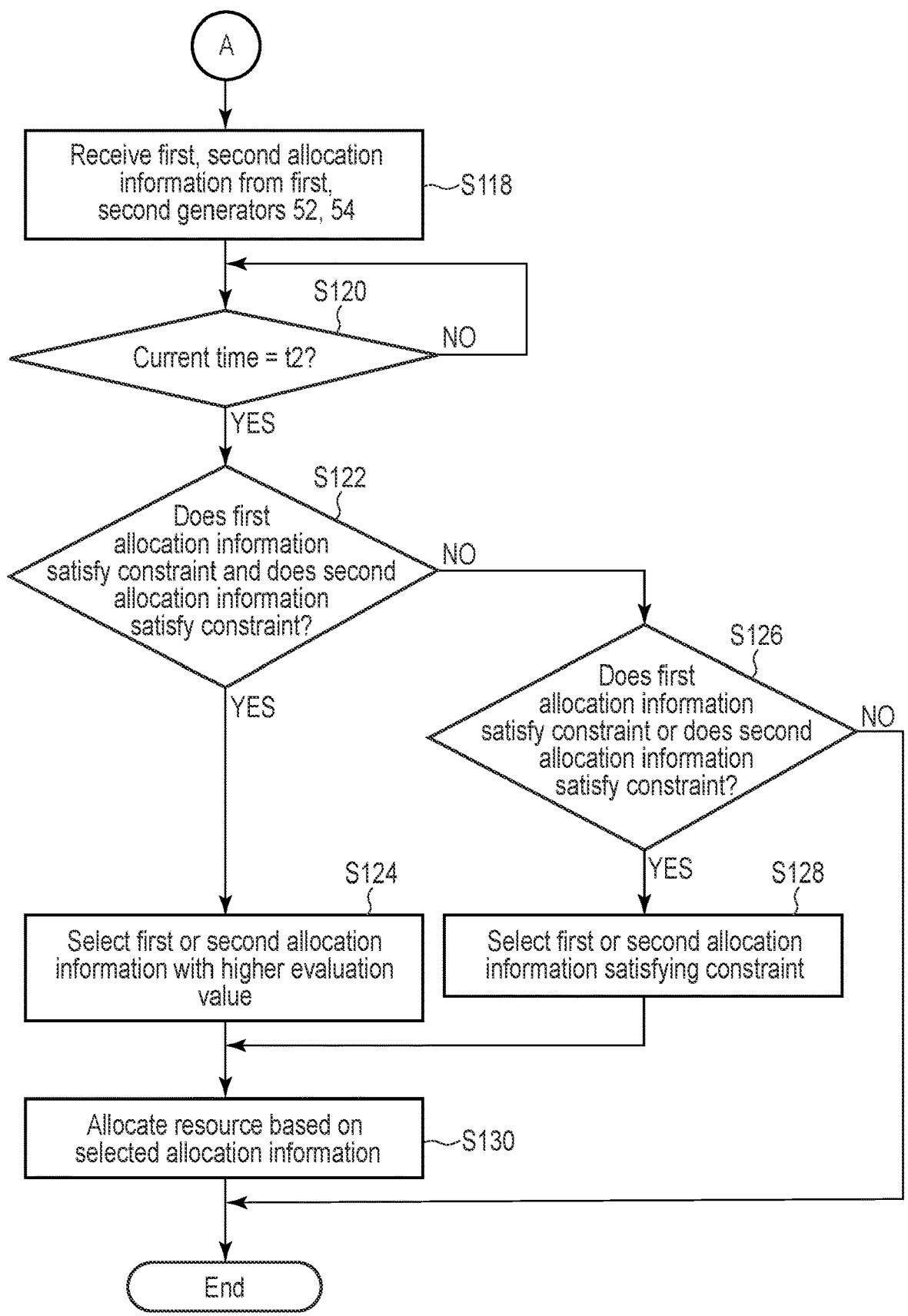
FIG. 13 is a flowchart for explaining an example of processing of the control device according to the embodiment.

FIGS. 12 and 13 are flowcharts for explaining an example of processing of the control device 44.

The control device 44 determines the first time t1 and the second time t2 (S102). The first time t1 is a time when resource allocation determination processing is started. The first time t1 may be a time scheduled in advance. The first time t1 may be an occurrence time of a predetermined event of starting resource allocation. The second time t2 is a timing to start the allocation processing based on the allocation result determined by the resource allocation determination processing.

The control device 44 determines whether or not the current time is the first time t1 (S104).

In a case where the current time is not the first time t1 (S104: NO), the control device 44 executes the determination processing of S104 again.

In a case where the current time is the first time t1 (S104: YES), the control device 44 selects at least one terminal 20 as the allocation target at the first time t1 (S106). The allocation target terminal at the first time t1 may correspond to all of the at least one terminal 20 wirelessly connected to the base station 40, or may correspond to a part of the at least one terminal 20.

Some selection examples of the allocation target will be described.

In a case where the maximum number of terminals 20 to which the allocation processing can be performed is determined in advance in one time of allocation processing, the control device 44 may select at least one terminal 20 as an allocation target such that the number of the terminals 20 does not exceed the maximum number.

At the first time t1, in a case where the downlink data is stored in the communication device 42, the control device 44 may preferentially select the terminal 20 of the transmission destination of the downlink data stored in the communication device 42 as the allocation target.

At the first time t1, in a case where the reservation request for resource allocation is stored in the communication device 42, the control device 44 may preferentially select the terminal 20 that transmits the reservation request stored in the communication device 42 as the allocation target.

At the first time t1, in a case where the downlink data of which the allowable latency time is equal to or less than a predetermined time is stored in the communication device 42, the control device 44 may preferentially select the terminal 20 of the transmission destination of the downlink data of which the allowable latency time is equal to or less than the predetermined time as the allocation target.

At the first time t1, in a case where the reservation request for resource allocation for transmitting and receiving data of which the allowable latency time is equal to or less than a predetermined time is stored in the communication device 42, the control device 44 may preferentially select the terminal 20 that transmits and receives data of which the allowable latency time is equal to or less than the predetermined time as the allocation target.

The control device 44 determines an allocation range of the modulation signal (S108). The allocation range is a range formed by a plurality of predetermined subcarriers and a plurality of predetermined OFDM symbols at a time after the second time t2. In a case where the allocation processing is executed for each predetermined subframe, the control device 44 may set an allocation range formed by all the subcarriers included in the modulation signal and a plurality of the OFDM symbols included in the predetermined subframes after the second time t2.

The allocation range may be changed every time the allocation processing is performed. The control device 44 may change the allocation range according to the number of the allocation target terminals 20. In a case where the allocation target includes the terminal 20 that transmits and receives data of which the allowable latency time is equal to or less than a predetermined time, the control device 44 may set an allocation range including a first number of OFDM symbols immediately after the second time t2. In a case where the allocation target does not include the terminal 20 that transmits and receives data of which the allowable latency time is equal to or less than a predetermined time, the control device 44 may set an allocation range including a second number of OFDM symbols immediately after the second time t2. The second number of OFDM symbols is greater than the first number of OFDM symbols. Therefore, the control device 44 can transmit and receive data of which the allowable latency time is equal to or less than a predetermined time at an earlier time.

The control device 44 receives (or acquires) identification information of the communication block having allocated to the terminal 20 that transmits and receives data included in the allocation range (S110). In a case where a resource block or resource element is selected as the communication block, the control device 44 receives identification information of a resource block already allocated to the terminal 20 that transmits and receives data included in the allocation range and identification information of allocated resource element.

The control device 44 determines at least one communication block except the allocated communication block included in the allocation range as an allocable communication block (S112). In a case where the resource block or the resource element is selected as the communication block, the control device 44 determines at least one resource block except the allocated resource block included in the allocation range as the allocable resource block, and determines at least one resource element except the allocated resource element included in the allocation range as the allocable resource element.

The control device 44 receives reference information regarding the allocation target terminal 20 (S114).

The reference information may be include an allowable latency time of data transmitted and received by the terminal 20. The reference information may include a communication quality of data transmitted and received by the terminal 20 in the past. The information regarding the communication quality of data may be a channel quality indicator (CQI), a modulation and coding scheme (MCS), a transmission power, an error rate, and the like for the terminal 20. The CQI is an index value indicating a reception quality of the terminal 20. The MCS is information indicating an orthogonal modulation scheme and a coding rate. The CQI, the MCS, the transmission power, and the error rate may be past average values or values in a previous time zone.

The reference information may include information regarding a data amount of the terminal 20. The information regarding a data amount may include an untransmitted data amount of the terminal 20, a data amount per unit time of data transmitted and received by the terminal 20 in the past, an occurrence frequency of data transmitted and received by the terminal 20 in the past, an occurrence tendency of data transmitted and received by the terminal 20 in the past, a predicted occurrence frequency of data transmitted and received by the terminal 20 in the future, and a predicted occurrence tendency of data transmitted and received by the terminal 20 in the future. The reference information may include a propagation channel matrix used by the terminal 20 in the past in massive MIMO wireless communication.

The control device 44 generates the first allocation request and the second allocation request, outputs the first allocation request to the first generator 52, and outputs the second allocation request to the second generator 54 (S116). Each of the first allocation request and the second allocation request includes identification information of the allocation target terminal 20, reference information regarding the allocation target terminal 20, and information indicating the second time t2. Each of the first allocation request and the second allocation request may include identification information of at least one allocable communication block. The identification information of the at least one allocable communication block includes information for specifying a position of the at least one allocable resource block in the frequency direction and a position of the at least one allocable resource block in the time direction, and information for specifying the position of the at least one allocable resource element in the frequency direction and a position of the at least one allocable resource element in the time direction.

When receiving the first allocation request from the control device 44, the first generator 52 obtains a first allocation result and outputs the first allocation information indicating the first allocation result to the control device 44. When receiving the second allocation request from the control device 44, the second generator 54 obtains a second allocation result and outputs the second allocation information indicating the second allocation result to the control device 44.

In a case where the first allocation result cannot be obtained until the second time t2, the first generator 52 outputs, to the control device 44 at the second time t2, non-allocable information indicating that allocation is impossible until the second timing t2. In a case where the second allocation result cannot be obtained until the second time t2, the second generator 54 outputs, to the control device 44 at the second time t2, non-allocable information indicating that allocation is impossible until the second timing t2.

Each of the first allocation information and the second allocation information indicates with which resource element of at least one resource element in the allocation range the allocation target terminal 20 transmits and receives data.

Each of the first allocation information and the second allocation information may further indicate a subcarrier interval for at least one resource block in the allocation range. Each of the first allocation information and the second allocation information may further indicate an orthogonal modulation scheme, a transmission power, and a coding rate of data included in at least one communication block. Each of the first allocation information and the second allocation information may further indicate a propagation channel matrix used by the allocation target terminal 20 in the massive MIMO scheme.

When receiving the first allocation request transmitted from the control device 44, the first generator 52 generates the first allocation information based on the identification information of the allocation target terminal 20, the identification information of at least one allocable communication block, and the reference information of the allocation target terminal. When receiving the second allocation request transmitted from the control device 44, the second generator 54 generates the second allocation information based on the identification information of the allocation target terminal 20, the identification information of at least one allocable communication block, and the reference information of the allocation target terminal.

The first generator 52 outputs the first allocation information to the control device 44 until a time with which the control device 44 can execute the allocation processing at the second time t2. That is, the first generator 52 outputs the first allocation information to the control device 44 at a time before the second time t2. The second generator 54 outputs the second allocation information to the control device 44 until a time with which the control device 44 can execute the allocation processing at the second time t2. That is, the second generator 54 outputs the second allocation information to the control device 44 at a time before the second time t2.

The first generator 52 may generate the first allocation information and the second generator 54 may generate the second allocation information based on the identification information of the allocation target terminal 20, the identification information of at least one allocable communication block, and the reference information of the allocation target terminal, by using a machine learning model. The first generator 52 and the second generator 54 may generate the first allocation information and the second allocation information by using a solver for a quadratic unconstrained binary optimization (QUBO) problem. In this case, the first generator 52 and the second generator 54 may generate an objective function of the QUBO problem based on the identification information of the allocation target terminal 20, the identification information of at least one allocable communication block, and the reference information of the allocation target terminal, give the generated objective function to the QUBO solver, acquire an allocation result which minimizes the objective function from the QUBO solver, and generate the allocation information based on the acquired allocation result.

The first generator 52 and the second generator 54 can change a calculation time from the input of the allocation request to the output of the allocation information. In a case where the first allocation request is received, the first generator 52 sets the calculation time such that the first allocation information can be reliably generated until the second time t2 based on the second time t2 included in the first allocation request. In a case where the second allocation request is received, the second generator 54 sets the calculation time such that the second allocation information can be reliably generated until the second time t2 based on the second time t2 included in the second allocation request.

The first generator 52 and the second generator 54 may include a plurality of machine learning models having different calculation times. In this case, the first generator 52 and the second generator 54 may respectively select machine learning models among a plurality of machine learning models, the machine learning models being capable of outputting the allocation information until the second time t2, and respectively generate the first allocation information and the second allocation information by using the selected machine learning models. The first generator 52 and the second generator 54 may respectively use the QUBO solvers capable of setting calculation times. In this case, the first generator 52 and the second generator 54 respectively set parameters related to calculation times in the QUBO solvers such that the allocation information can be output until the second time t2.

The control device 44 receives the first allocation information from the first generator 52, and receives the second allocation information from the second generator 54 (S118).

The control device 44 determines whether or not the current time is the second time t2 (S120).

In a case where the current time is not the second time t2 (S120: NO), the control device 44 executes the determination processing of S120 again.

In a case where the current time is the second time t2 (S120: YES), the control device 44 determines whether or not a first allocation information satisfies a constraint and whether or not a second allocation information satisfies the constraint (S122).

In a case where the first allocation information satisfies the constraint and the second allocation information satisfies the constraint (S122: YES), the control device 44 selects highly evaluated information of the first allocation information and the second allocation information as the allocation information (S124).

In a case where at least one of the first allocation information and the second allocation information does not satisfy the constraint (S122: NO), the control device 44 determines whether or not a first allocation information satisfies the constraint or whether or not a second allocation information satisfies the constraint (S126).

In a case where the first allocation information or the second allocation information satisfies the constraint (S126: YES), the control device 44 selects, as the allocation information, the first allocation information or second allocation information which satisfies the constraint (S128).

In a case where the first allocation information and the second allocation information do not satisfy the constraint (S126: NO), the control device 44 ends the processing.

The control device 44 executes the allocation processing based on the allocation information selected in S124 or the allocation information selected in S128 (S130). Thereafter, the control device 44 causes at least one terminal 20 and the communication device 42 to transmit and receive a modulation signal according to the allocation processing.

By executing the above-described processing, the communication device 42 can transmit and receive data to and from the terminal 20 subjected to the allocation processing in the allocation range.

Figure 14:
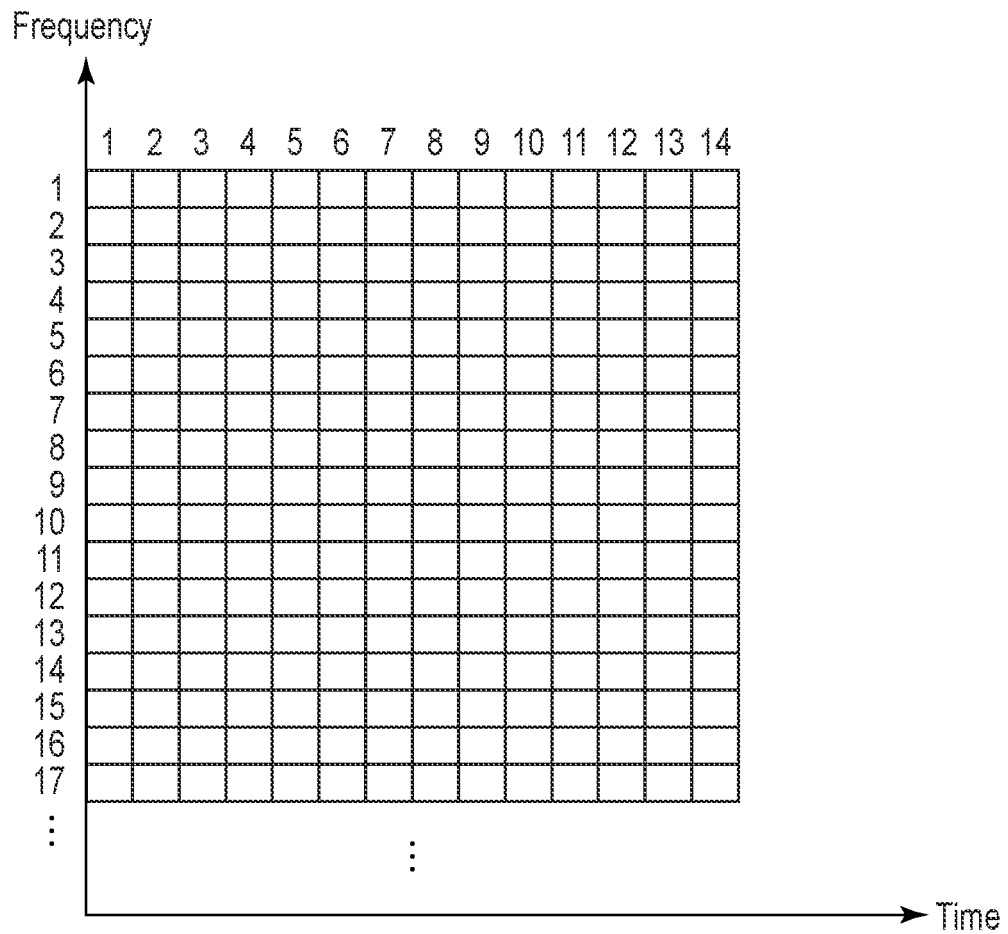
FIG. 14 is a diagram for explaining an example of description format of allocation information according to the embodiment.

FIG. 14 is a diagram for explaining an example of description format of the allocation information.

The allocation information indicates which communication block included in the allocation range, for example, which resource block group the allocation target terminal 20 uses to transmit or receive data. Some of at least one resource block group included in the allocation range may not be allocated to any terminal 20.

An example of the allocation information is represented by a plurality of boxes arranged in a matrix shape indicating at least one communication block in the allocation range (FIG. 14). One position of a plurality of the boxes arranged in the matrix shape in a row direction or in a column direction is specified by the position of the subcarrier. The other position of a plurality of the boxes arranged in the matrix shape in a row direction or in a column direction is specified by the position of the OFDM symbol. FIG. 14 illustrates a description format in a case where (12 subcarriers×16)×14 OFDMs form one resource block group, and 17 resource block groups correspond to the allocation range.

The allocation information in such a description format is a solution to a problem for solving which one of the allocation target terminals 20 is associated with each of a plurality of boxes.

The first generator 52 and the second generator 54 can obtain the allocation information by training a machine learning model such as a neural network in advance. For example, the designer of the first generator 52 and the second generator 54 creates a neural network that outputs the allocation information when being given input information including the identification information of the allocation target terminal 20, the identification information of at least one allocable communication block, and the reference information of the allocation target terminal. The designer trains the created neural network based on training data including past input information and an ideal solution. The first generator 52 and the second generator 54 can generate the allocation information based on the identification information of the allocation target terminal 20, the identification information of at least one allocable communication block, and the reference information of the allocation target terminal by using the machine learning model created in this manner.

The first generator 52 and the second generator 54 can also generate the allocation information by solving the QUBO problem in which a quadratic function including a plurality of binary variables is an objective function. In this case, the quadratic function which is the objective function includes at least one binary variable corresponding to the allocation target terminal 20 by the number corresponding to a plurality of the boxes forming the matrix. The quadratic function may further include a binary variable indicating a constraint.

The designer of the first generator 52 and the second generator 54 creates the quadratic function that can obtain the allocation information in which a solution in a case of being minimized is close to a preset condition, based on the identification information of the allocation target terminal, the identification information of at least one allocable communication block, and the reference information of the allocation target terminal. The designer of the first generator 52 and the second generator 54 creates a formulation algorithm for generating such a quadratic function based on the identification information of the allocation target terminal, the identification information of at least one allocable communication block, and the reference information of the allocation target terminal.

The first generator 52 and the second generator 54 generates the quadratic function which is the objective function based on the identification information of the allocation target terminal, the identification information of at least one allocable communication block, and the reference information of the allocation target terminal by using the formulation algorithm created in this manner. The first generator 52 and the second generator 54 give the generated quadratic function to the QUBO solver to calculate a solution of the quadratic function. The first generator 52 and the second generator 54 generate the allocation information based on the solution of the quadratic function calculated by the QUBO solver.

For example, the first generator 52 and the second generator 54 may determine the allocation order for the terminals to be subjected to the allocation processing, and generate the allocation information by associating the terminals with a plurality of boxes arranged in a matrix shape according to the determined order. In this case, the first generator 52 and the second generator 54 may rank the terminals in descending order of the amount of data to be transmitted and received, in descending order of the allowable latency time, or in descending order of the amount of data transmitted and received in the past.

Figure 15:
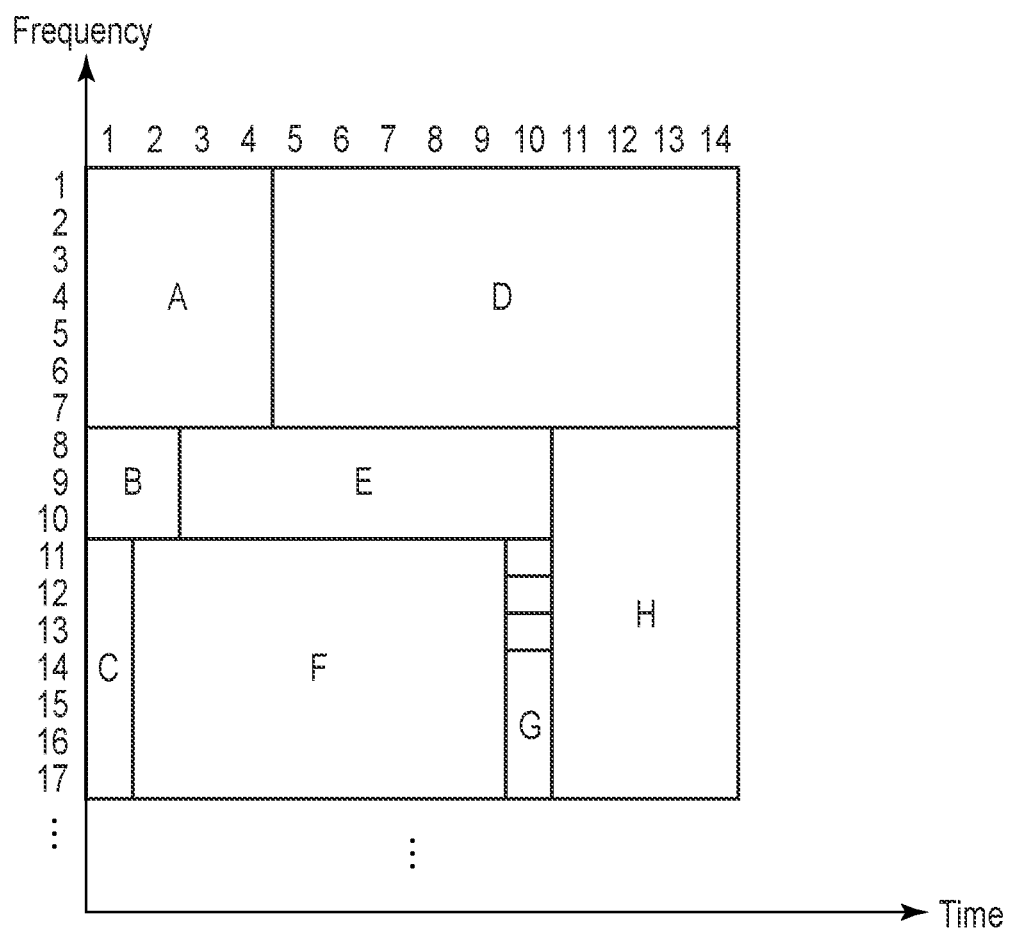
FIG. 15 is a diagram for explaining an example of a format of the allocation information according to the embodiment.

The first allocation information generated by the first generator 52 and the second allocation information generated by the second generator 54 have the same format. FIG. 15 is a diagram for explaining an example of a format of the first allocation information generated by the first generator 52 or a format of the second allocation information generated by the second generator 54. "A" to "H" illustrated in FIG. 15 are items of information for identifying the users of the terminal 20 to which the resource element is allocated.

The reference information may include an allowable latency time of data transmitted and received by the allocation target terminal 20. In this case, each of the first generator 52 and the second generator 54 uses the machine learning model or formulation algorithm which generates the first allocation information or the second allocation information so as to allocate a terminal having a short allowable latency time to the resource element for which transmission and reception are completed at a time earlier than a terminal having a long allowable latency time. Specifically, each of the first generator 52 and the second generator 54 uses the machine learning model or formulation algorithm which generates the first allocation information or the second allocation information so as to allocate a terminal having a short allowable latency time rather than a terminal having a long allowable latency time to the resource element of a temporally earlier OFDM symbol. For example, the reference information indicates that the terminal 20 of a user A has a shorter allowable latency time of data to be transmitted and received than the terminal 20 of a user D. In this case, by using the machine learning model or the formulation algorithm, each of the first generator 52 or the second generator 54 can allocate, to the terminal 20 of the user A, a resource block temporally earlier than the resource block allocated to the terminal 20 of the user D, as illustrated in FIG. 15.

Each of the first generator 52 and the second generator 54 may use the machine learning model or formulation algorithm that generates the allocation information such that the number of terminals capable of performing wireless communication increases within the allowable latency time.

The reference information may include a data amount per unit time of data transmitted and received in the past or a data amount per unit time which is predicted in the future in the allocation target terminal. In this case, each of the first generator 52 and the second generator 54 may use the machine learning model or formulation algorithm that generates the allocation information such that the number of terminals satisfying constraint regarding the amount of data transmitted and received per unit time increases. In this case, each of the first generator 52 and the second generator 54 may use the machine learning model or formulation algorithm that generates the allocation information such that the terminal, of which a data amount per unit time of data transmitted and received in the past or a data amount per unit time which is predicted in the future exceeds a threshold, satisfies constraint regarding the amount of data transmitted and received per unit time. Each of the first generator 52 and the second generator 54 may use the machine learning model or formulation algorithm that generates the allocation information such that the data amount of all the terminals, the data transmitted and received per unit time, is maximized.

The reference information may include a communication quality of data transmitted and received by the allocation target terminal in the past. In this case, each of the first generator 52 and the second generator 54 may use the machine learning model or formulation algorithm that generates the allocation information such that a coding rate higher than that of the terminal having a low communication quality or an orthogonal modulation scheme higher than that of the terminal having a low communication quality is allocated to the terminal having a high communication quality of data transmitted and received in the past.

Specifically, each of the first generator 52 and the second generator 54 uses the machine learning model or formulation algorithm that generates the allocation information such that a resource element included in the resource block having a subcarrier interval wider than that of a resource block which is allocated to the terminal having a low communication quality is allocated to the terminal having a high communication quality of data transmitted and received in the past. For example, the reference information indicates that the terminal 20 of a user C has a communication quality higher than that of the terminal 20 of a user B. In this case, by using the machine learning model or the formulation algorithm, each of the first generator 52 and the second generator 54 can allocate, to the terminal 20 of the user C, subcarriers more than the subcarriers allocated to the terminal 20 of the user B, as illustrated in FIG. 15.

FIG. 16 is a diagram for explaining an example of the first generator 52 and the second generator 54. Each of the first generator 52 and the second generator 54 generates the allocation information by using the machine learning model.

Each of the first generator 52 and the second generator 54 includes a request receiver unit 102, a generation unit 104, and a setting unit 106.

The request receiver unit 102 receives the first allocation request and the second allocation request (simply referred to as an allocation request) from the control device 44. The first allocation information and the second allocation information are also simply referred to as allocation information. The request receiver unit 102 outputs, to the generation unit 104, the identification information of the allocation target terminal, the identification information of at least one allocable communication block (at least one allocable resource block and/or at least one allocable resource element), and the reference information of the allocation target terminal, which is included in the allocation request. The request receiver unit 102 outputs information indicating the second time t2 included in the allocation request to the setting unit 106.

The generation unit 104 includes a first machine learning model 104-1, a second machine learning model 104-2, . . . , and an n-th machine learning model 104-$n$. n is an integer of two or more. Each of a plurality of the machine learning models 104-1 to 104-$n$ receives the identification information of the allocation target terminal, the identification information of at least one allocable communication block, and the reference information of the allocation target terminal, and outputs the allocation information. Each of a plurality of the machine learning models is, for example, a neural network trained in advance.

A plurality of the machine learning models 104-1 to 104-$n$ respectively have different calculation times, respectively, until the allocation information is output after the allocation request is input. A plurality of the machine learning models 104-1 to 104-$n$ respectively have different internal arithmetic structures and different arithmetic algorithms. For example, in a case where each of a plurality of the machine learning models 104-1 to 104-$n$ is a neural network, a plurality of the machine learning models 104-1 to 104-$n$ respectively have the different number of layers and the different number of nodes. Therefore, a plurality of the machine learning models 104-1 to 104-$n$ respectively have different accuracies of the allocation information actually output with respect to ideal allocation information to be obtained for the input allocation request.

For example, the first machine learning model 104-1 has the highest calculation speed but the lowest accuracy. The n-th machine learning model 104-$n$ has the highest accuracy but the lowest calculation speed. The calculation speed stepwisely decreases and the accuracy stepwisely increases from the first machine learning model 104-1 to the n-th machine learning model 104-$n$.

The generation unit 104 returns the allocation information from one of a plurality of the machine learning models 104-1 to 104-$n$ to the control device 44.

When the first generator 52 receives the allocation request, the setting unit 106 selects, from among a plurality of the machine learning models 104-1 to 104-$n$, a machine learning model with the highest accuracy, which can transmit the first allocation information until a return time when the control device 44 can execute the allocation processing until the second time t2. When the second generator 54 receives the allocation request, the setting unit 106 selects, from among a plurality of the machine learning models 104-1 to 104-$n$, a machine learning model with the highest calculation speed, which can transmit the second allocation information until a return time when the control device 44 can execute the allocation processing until the second time t2. The selected machine learning model generates the allocation information.

Figure 17:
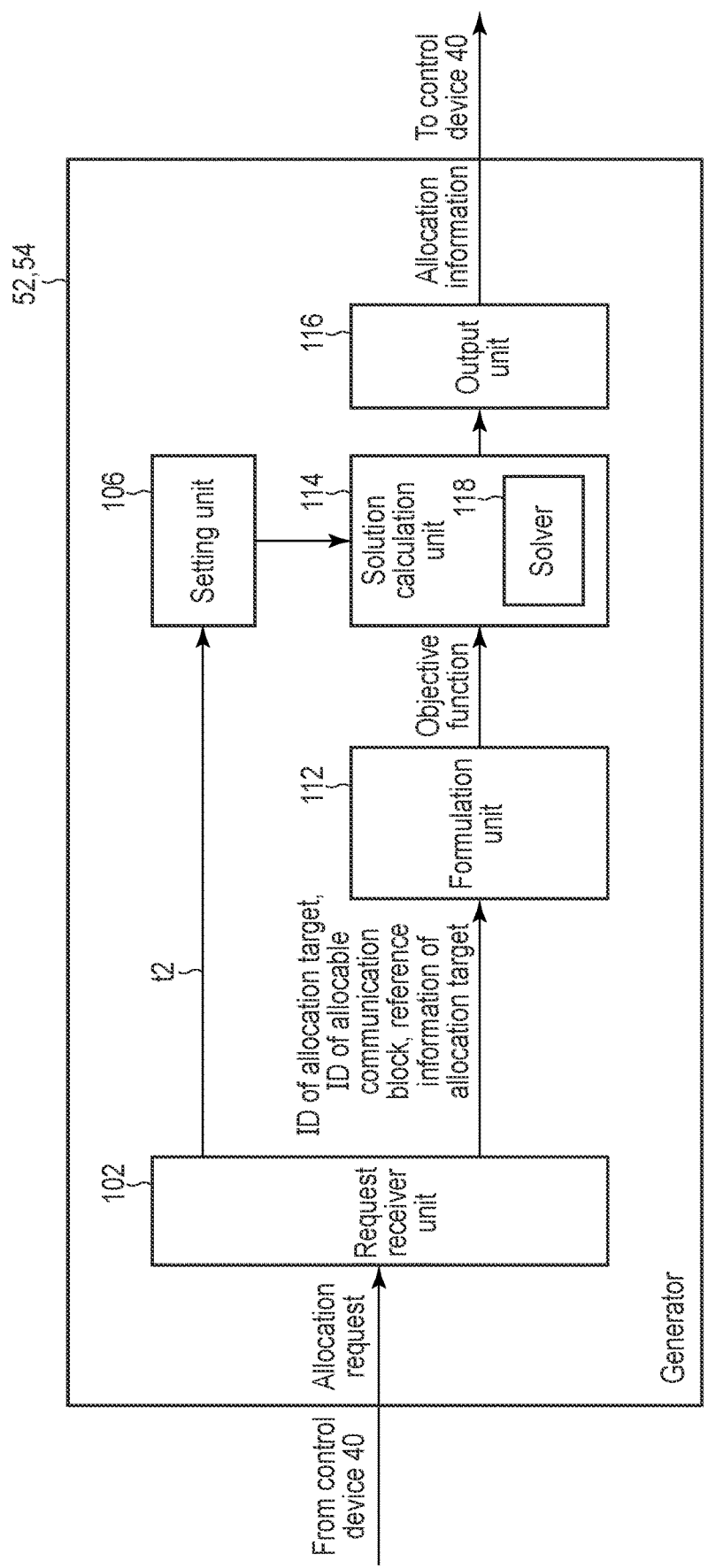
FIG. 17 is a diagram for explaining another example of the first generator and the second generator according to the embodiment.

FIG. 17 is a diagram for explaining another example of the first generator 52 and the second generator 54. Each of the first generator 52 and the second generator 54 generates the allocation information by solving the QUBO problem.

Each of the first generator 52 and the second generator 54 includes the request receiver unit 102, a formulation unit 112, a solution calculation unit 114, an output unit 116, and the setting unit 106.

The request receiver unit 102 receives the allocation request from the control device 44. The request receiver unit 102 outputs, to the formulation unit 112, the identification information of the allocation target terminal, the identification information of at least one allocable communication block (at least one allocable resource block and/or at least one allocable resource element), and the reference information of the allocation target terminal, which is included in the allocation request. The request receiver unit 102 outputs information indicating the second time t2 included in the allocation request to the setting unit 106.

The formulation unit 112 generates the objective function for the QUBO problem according to the formulation algorithm generated in advance by the designer based on the identification information of the allocation target terminal, the identification information of at least one allocable communication block, and the reference information of the allocation target terminal. The QUBO problem is a quadratic function including a plurality of binary variables. Each of at least some of a plurality of the binary variables corresponds to any of at least one resource element and also corresponds to any of the allocation target terminals, and indicates whether or not the corresponding terminal is allocated to the corresponding resource element. That is, at least some of a plurality of the binary variables indicates the allocation information. The formulation unit 112 outputs the generated objective function to the solution calculation unit 114.

The solution calculation unit 114 receives the objective function generated by the formulation unit 112 and calculates a solution to the QUBO problem by using a solver 118. The solver 118 is an example of the QUBO solver, and calculates a solution that minimizes the objective function. The solver 118 may be included in the first generator 52 and the second generator 54, or may be provided outside the first generator 52 and the second generator 54.

The solver 118 can change a calculation time until the solution is output after the objective function is input by changing setting of parameters. For example, in the solver 118, a probability of outputting an approximate solution closer to the optimal solution is higher as the calculation time is longer, and a probability of outputting an approximate solution farther from the optimal solution is higher as the calculation time is shorter.

The solver 118 is, for example, a device using a simulated bifurcation (SB) algorithm. The solver 118 using the SB algorithm can change a parameter indicating an end time to change a time until the solution is output.

The output unit 116 receives a solution to the QUBO problem from the solution calculation unit 114. The output unit 116 generates the allocation information based on the solution to the QUBO problem. More specifically, the output unit 116 receives solutions of a plurality of the binary variables included in the objective function, and generates the allocation information. The output unit 116 returns the generated allocation information to the control device 44.

When each of the generators 52 and 54 receives the allocation request, the setting unit 106 sets a parameter for a calculation time in the solver 118 based on the second time t2. More specifically, the setting unit 106 sets the calculation time of the solver 118 such that the allocation information is transmitted until the return time when the control device 44 can execute the allocation processing until the second time t2. When the first generator 52 receives the allocation request, the setting unit 106 sets the calculation time of the solver 118 so as to output the allocation information with the longest calculation time and the highest accuracy in a range in which the allocation information can be output until the return time. In a case where the solver 118 uses the SB algorithm, the setting unit 106 sets a parameter indicating an end time. When the second generator 54 receives the allocation request, the setting unit 106 sets the calculation time of the solver 118 so as to output the allocation information with the shortest calculation time and the lowest accuracy in a range in which the allocation information can be output until the return time. In a case where the solver 118 uses the SB algorithm, the setting unit 106 sets a parameter indicating an end time.

Hereinafter, a modification example of the communication system regarding the arrangement of the allocation information generation device 50 will be described.

Figure 18:
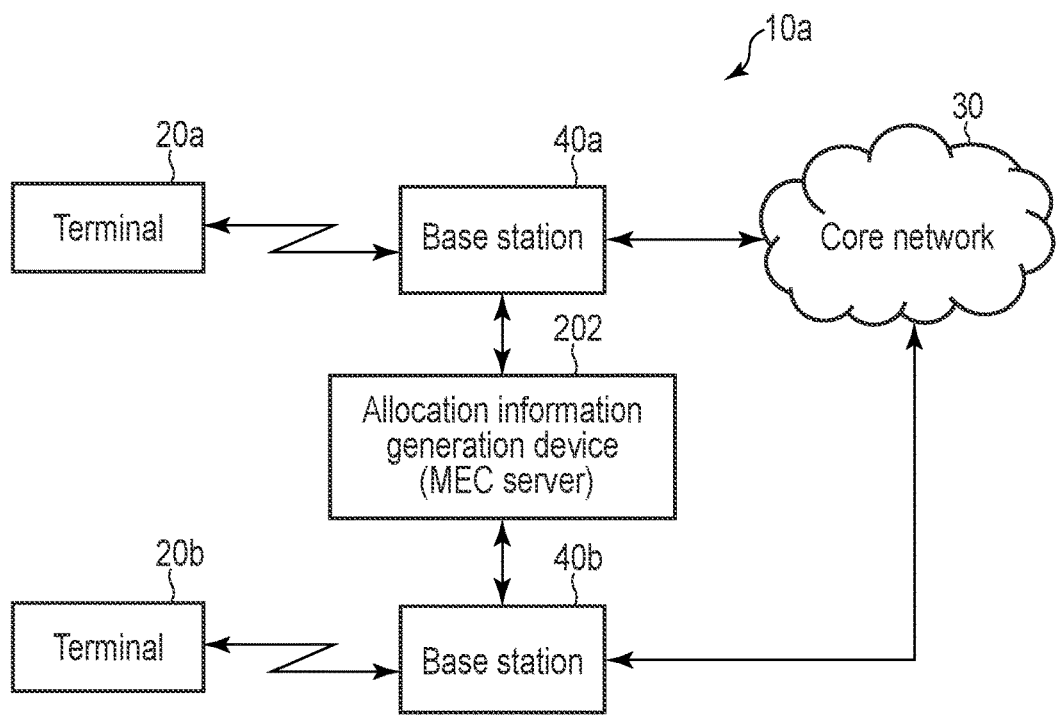
FIG. 18 is a diagram for explaining an example of a communication system according to a first modification of the embodiment.

FIG. 18 is a diagram for explaining an example of the communication system 10$a$ according to the first modification example. The communication system 10$a$ includes the base stations 40$a$ and 40$b$. The terminal 20$a$ can communicate with the base station 40$a$. The terminal 20$b$ can communicate with the base station 40$b$. An allocation information generation device 202 is connected to the base stations 40$a$ and 40$b$. The allocation information generation device 202 corresponds to the allocation information generation device (MEC server) 50 illustrated in FIG. 1.

The allocation information generation device 202 receives the allocation request from the base station 40$a$ or 40b. The allocation information generation device 202 generates the allocation information in response to the reception of the allocation request, and returns the generated allocation information to the base station 40a or 40b that transmits the allocation request.

Figure 19:
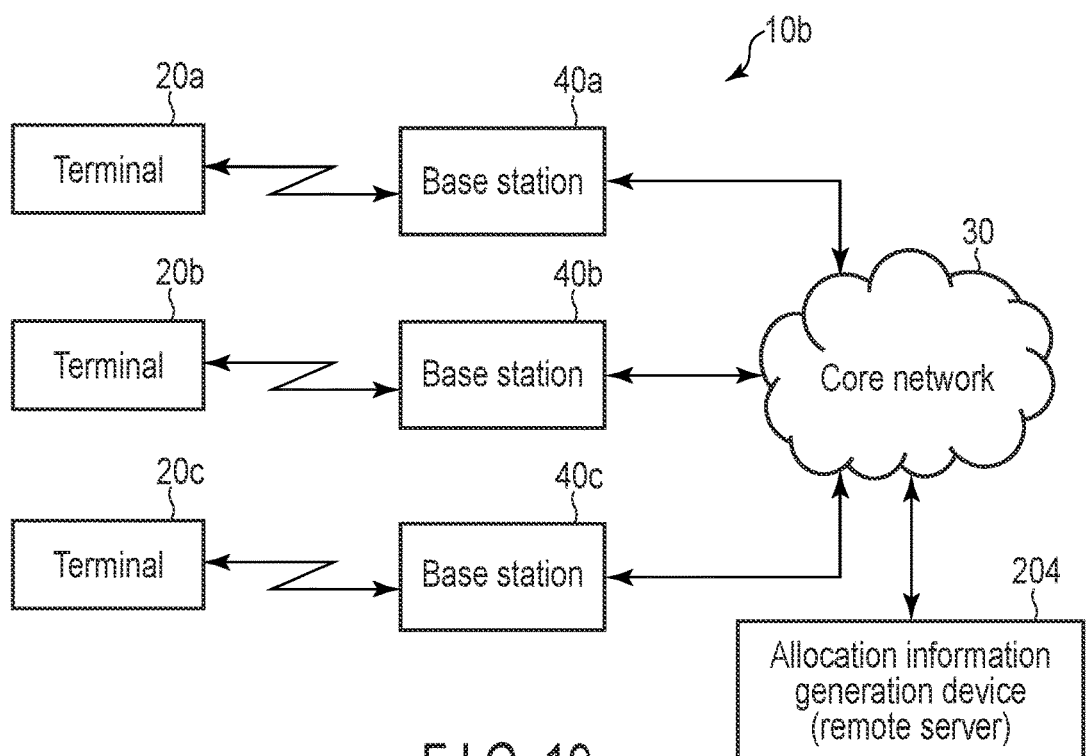
FIG. 19 is a diagram for explaining an example of a communication system according to a second modification of the embodiment.

FIG. 19 is a diagram for explaining an example of the communication system 10b according to the second modification example. The communication system 10b includes the base stations 40a, 40b, and 40c. The terminal 20a can communicate with the base station 40a. The terminal 20b can communicate with the base station 40b. The terminal 20c can communicate with the base station 40c. An allocation information generation device 204 is connected to the core network 30. The allocation information generation device 204 corresponds to the allocation information generation device 50 illustrated in FIG. 1. The allocation information generation device 204 is also referred to as a remote server.

The allocation information generation device 204 receives the allocation request from the base station 40a, 40b, or 40c via the core network 30. The allocation information generation device 204 generates the allocation information in response to the reception of the allocation request, and returns the generated allocation information to the base station 40a, 40b, or that transmits the allocation request via the core network 30.

Figure 20:
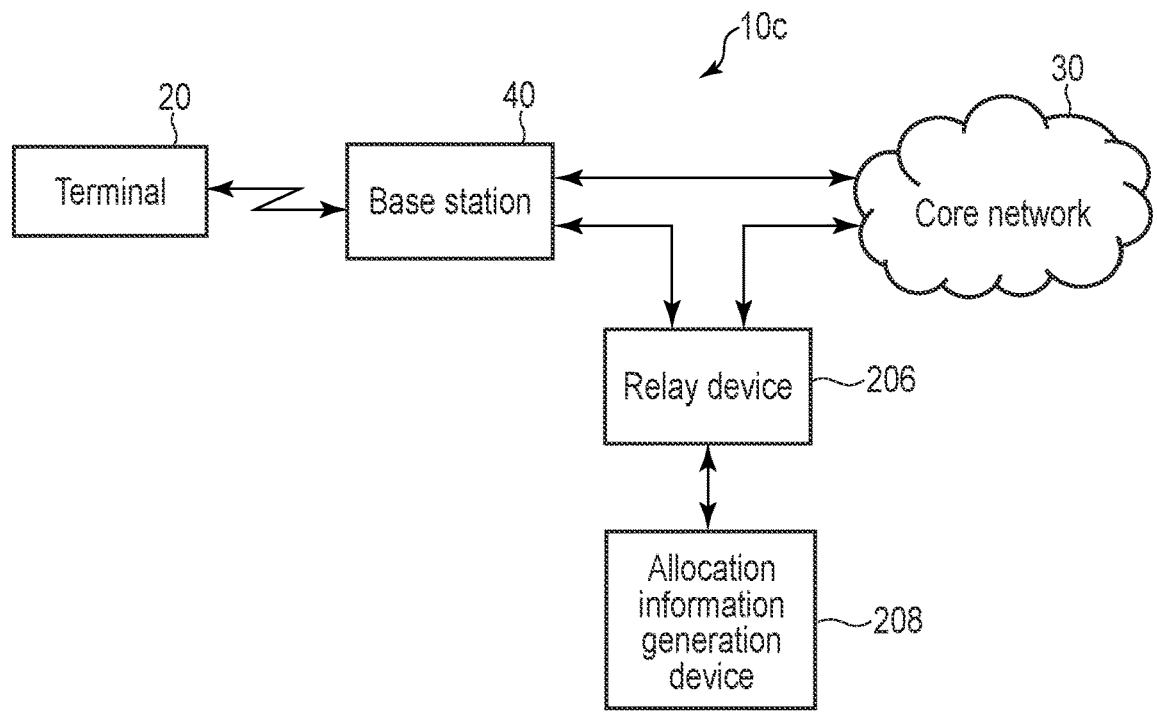
FIG. 20 is a diagram for explaining an example of a communication system according to a third modification of the embodiment.

FIG. 20 is a diagram for explaining an example of the communication system 10c according to the third modification example. The communication system 10c includes a relay device 206. The relay device 206 relays transmission and reception of information between the base station 40 and the core network 30. An allocation information generation device 208 is connected to the relay device 206. The allocation information generation device 208 corresponds to the allocation information generation device 50 illustrated in FIG. 1. The relay device 206 relays transmission and reception of information between the base station 40 and the allocation information generation device 208. The relay device 206 receives, from the core network 30, part of the reference information of the allocation target terminal necessary for generating the allocation information. The base station 40 outputs the allocation request to the allocation information generation device 208 via the relay device 206. In response to reception of the allocation request, the relay device 206 receives, from the core network 30, some information included in the reference information of the allocation target terminal, adds the acquired information to the allocation request, and transfers the allocation request to the allocation information generation device 208. The allocation information generation device 208 generates the allocation information in response to the reception of the allocation request, and returns the generated allocation information to the base station 40 via the relay device 206.

Figure 21:
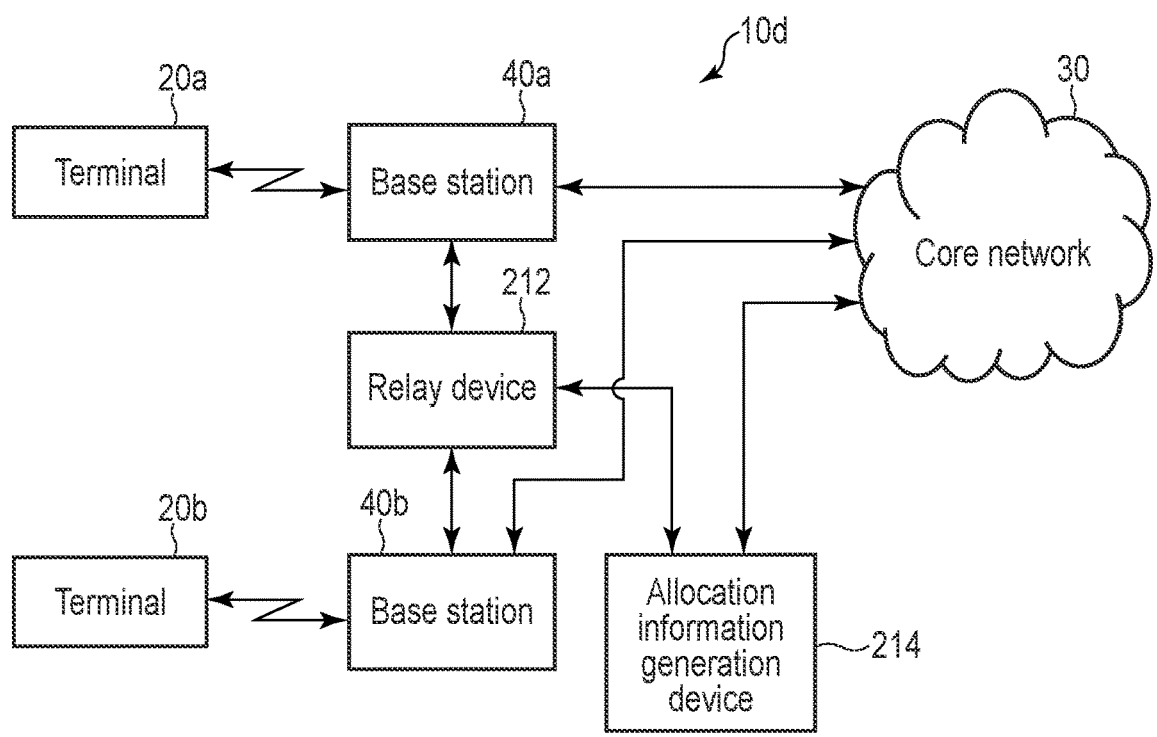
FIG. 21 is a diagram for explaining an example of a communication system according to a fourth modification of the embodiment.

FIG. 21 is a diagram for explaining an example of the communication system 10d according to the fourth modification example. The communication system 10d includes a relay device 212. The relay device 212 relays transmission and reception of information between each of base stations 40a and 40b and an allocation information generation device 214. The terminal 20a can communicate with the base station 40a. The terminal 20b can communicate with the base station 40b. Each of the base stations 40a and 40b outputs the allocation request to the allocation information generation device 214 via the relay device 212. The allocation information generation device 214 generates the allocation information in response to the reception of the allocation request, and returns the generated allocation information to the base station or 40b that outputs the allocation request via the relay device 212.

FIG. 22 is a diagram for explaining an example of the communication system 10e according to the fifth modification example. The communication system 10e includes the relay devices 212a and 212b. The communication system 10e includes the allocation information generation devices 214a and 214b. The relay devices 212a and 212b respectively correspond to the allocation information generation devices 214a and 214b. The relay device 212a relays transmission and reception of information between the base stations 40a and 40b and the allocation information generation device 214a. The relay device 212b relays transmission and reception of information between the base stations 40c and 40d and the allocation information generation device 214b. Each of the base stations 40a and 40b outputs the allocation request to the allocation information generation device 214a via the relay device 212a. Each of the base stations 40c and 40d outputs the allocation request to the allocation information generation device 214b via the relay device 212b. The allocation information generation device 214a generates the allocation information in response to the reception of the allocation request, and returns the generated allocation information to the base station 40a or 40b that outputs the allocation request via the relay device 212a. The allocation information generation device 214b generates the allocation information in response to the reception of the allocation request, and returns the generated allocation information to the base station 40c or 40d that outputs the allocation request via the relay device 212b.

Figure 23:
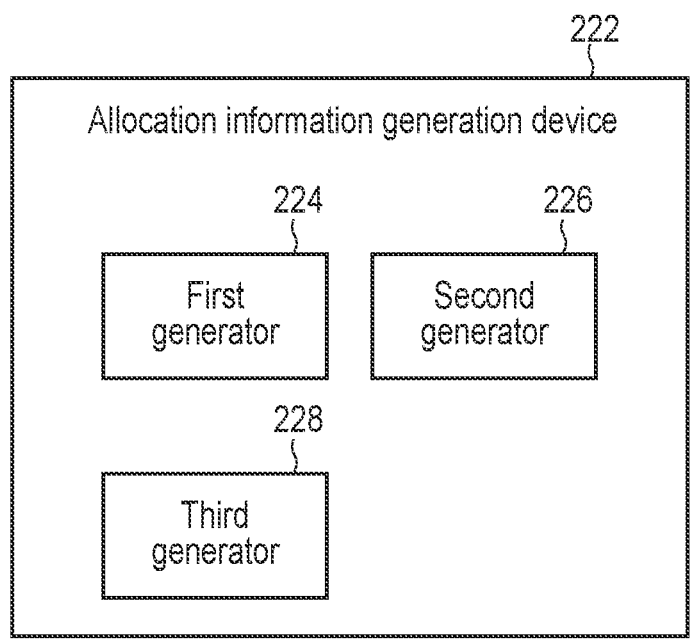
FIG. 23 is a diagram for explaining a modification example of an allocation information generating device.

FIG. 23 is a diagram for explaining a modification example of a configuration of the allocation information generation device 50. In FIG. 1, the allocation information generation device 50 including the two generators 52 and 54 has been described. FIG. 23 illustrates an allocation information generation device 222 including three generators 224, 226, and 228. The first generator 224, the second generator 226, and the third generator 228 respectively perform different allocation determination processing. The first generator 224 obtains a first allocation result. The second generator 226 obtains a second allocation result. The third generator 228 obtains a third allocation result. The degree of evaluation for the first allocation result is different from the degree of evaluation for the second allocation result and the degree of evaluation for the third allocation result. The possibility that the first allocation result satisfies a constraint is different from the possibility that the second allocation result satisfies the constraint and the possibility that the third allocation result satisfies the constraint. For example, the first allocation result is highly evaluated, but is less likely to satisfy the constraint. The third allocation result is low evaluated, but is likely to satisfy the constraint. The second allocation result is medium evaluated and is medium likely to satisfy the constraint. The first generator 224, the second generator 226, and the third generator 228 may be implemented as separate devices, or may be implemented in the same apparatus.

FIG. 24 is a diagram for explaining another modification example of a configuration of the allocation information generation device 50. In FIG. 1, the allocation information generation device 50 is common to all the terminals 20. Each of the terminals 20 may have a different request for communication. When the request for communication is different, the allocation determination processing of the allocation information generation device 50 is also different. For example, the terminals 20 may include a terminal that is to perform high-speed and large-capacity communication, a terminal that is to perform low-latency communication, and a terminal that is to enable multiple simultaneous connection. The terminals are classified into a plurality of terminal groups according to a request for communication. The allocation information generation device 50 suitable for each terminal group is used.

Three allocation information generation devices 230, 240, and 250 are connected to the base station 40. The terminal that is to perform high-speed and large-capacity communication is referred to as an enhanced mobile broadband (eMBB) terminal. The terminal that is to perform low-latency communication is referred to as an ultra-reliable low-latency communication (URLLC) terminal. The terminal that is to enable multiple simultaneous connection is referred to as a massive machine type communication (mMTC) terminal.

The first allocation information generation device 230 includes a first generator 232 and a second generator 234. Similarly to the allocation information generation device 50 illustrated in FIG. 1, the first allocation information generation device 230 determines, as the allocation information, information that satisfies a constraint or is highly evaluated of the first allocation information obtained by the first generator 232 and the second allocation information obtained by the second generator 234. Each of the first generator 232 and the second generator 234 performs allocation determination processing according to the allocation policy for the eMBB terminal.

The second allocation information generation device 240 includes a first generator 242 and a second generator 244. Similarly to the allocation information generation device 50 illustrated in FIG. 1, the second allocation information generation device 240 determines, as the allocation information, information that satisfies a constraint or is highly evaluated of the first allocation information obtained by the first generator 242 and the second allocation information obtained by the second generator 244. Each of the first generator 242 and the second generator 244 performs allocation determination processing according to the allocation policy for the URLLC terminal.

The third allocation information generation device 250 includes a first generator 252 and a second generator 254. Similarly to the allocation information generation device 50 illustrated in FIG. 1, the third allocation information generation device 250 determines, as the allocation information, information that satisfies a constraint or is highly evaluated of the first allocation information obtained by the first generator 252 and the second allocation information obtained by the second generator 254. Each of the first generator 252 and the second generator 254 performs allocation determination processing according to the allocation policy for the mMTC terminal.

The control device 44 sequentially transmits the allocation requests to the first allocation information generation device 230, the second allocation information generation device 240, and the third allocation information generation device 250 in predetermined order.

For example, since the URLLC terminal is strictly required to have a latency time, it is desirable that resources are allocated to the URLLC terminal such that all data can be transmitted within the latency time or within one slot as much as possible. Therefore, first, the control device 44 may transmit the allocation request to the second allocation information generation device 240. The control device 44 also notifies the second allocation information generation device 240 of information necessary for resource allocation, for example, a data amount of the terminal, an allowable latency time, channel information, and the like. When receiving the allocation request from the control device 44, the second allocation information generation device 240 returns the allocation information to the control device 44 until a first fixed time elapses.

An example of the policy of resource allocation to the URLLC terminal followed by the second allocation information generation device 240 is that the latter seven symbols among 14 OFDM symbols forming one slot are not allocated, the last symbol to be used is allocated earlier as much as possible, and the average latency time of the user of the URLLC terminal is the shortest. The second allocation information generation device 240 may determine the resource allocation by using the full search, the machine learning, the solver of the QUBO problem, or the like based on the policy. In a case where the first fixed time is short, the second allocation information generation device 240 may change the allocation algorithm such that the search range of the optimum solution becomes narrower or an algorithm that can be calculated more easily is used. In a case where the first fixed time is long, the second allocation information generation device 240 may use an algorithm having a wide search range such that an optimum combination is fully searched.

The control device 44 may transmit the allocation request to the first allocation information generation device 230 following the second allocation information generation device 240. The second allocation information generation device 240 notifies the first allocation information generation device 230 of the communication block information allocated to the URLLC terminal via the control device 44 or directly. The control device 44 also notifies the first allocation information generation device 230 of information necessary for resource allocation, for example, a data amount of the terminal, an allowable latency time, channel information, and the like. The first allocation information generation device 230 allocates a communication block other than the communication block allocated to the URLLC terminal to the eMBB terminal. When receiving the allocation request from the control device 44, the first allocation information generation device 230 returns the allocation information to the control device 44 until a second fixed time elapses.

Examples of the policy of resource allocation to the eMMB terminal followed by the first allocation information generation device 230 include round robin, max throughput, and proportional fairness. The first allocation information generation device 230 may determine the resource allocation by using the full search, the machine learning, the solver for solving the QUBO problem, or the like based on the policy. In a case where the second fixed time is short, the first allocation information generation device 230 may use an algorithm having a narrow search range. In a case where the second fixed time is long, the first allocation information generation device 230 may use the algorithm having a wide search range. Since the latency request is not strict for the eMBB terminal, the eMBB terminal does not need to transmit all the data within the latency time or within one slot, and may carry the data to the next slot.

The control device 44 may transmit the allocation request to the third allocation information generation device 250 following the first allocation information generation device 230. The first allocation information generation device 230 notifies the third allocation information generation device 250 of the communication block information allocated to the eMBB terminal via the control device 44 or directly. The third allocation information generation device 250 allocates, to the mMTC terminal, a communication block other than the communication blocks allocated to the URLLC terminal and the eMBB terminal. The control device 44 also notifies the third allocation information generation device 250 of information necessary for resource allocation, for example, a data amount of the terminal, an allowable latency time, channel information, and the like. When receiving the allocation request from the control device 44, the third allocation information generation device 250 returns the allocation information to the control device 44 until a third fixed time elapses.

The ratios of the first fixed time, the second fixed time, and the third fixed time depend on the number of users, the data amount, the channel situation, and the like, of each terminal group. For example, in a case where the number of users of a first terminal group increases, the first fixed time may be lengthened, and the second fixed time and the third fixed time may be shortened.

The sum of the first fixed time, the second fixed time, and the third fixed time is a time equivalent to the slot length.

Each of the first allocation information generation device 230, the second allocation information generation device 240, and the third allocation information generation device 250 may include three generators similarly to the allocation information generation device 222 illustrated in FIG. 23.

The order in which the control device 44 transmits the allocation request is not limited to the order of the second allocation information generation device 240, first allocation information generation device 230, and third allocation information generation device 250 described above, and may be another order.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a base station configured to perform communication based on a communication standard with respect to a target terminal selected from terminals; and
an allocation information generation device configured to receive an allocation request from the base station and determine a resource used for the communication, wherein
the allocation request comprises a first request and a second request;
the allocation information generation device comprises a first generator configured to perform a first processing in response to the first request and a second generator configured to perform a second processing in response to the second request, the second processing being different from the first processing;
the first generator is configured to output first allocation information until a first time elapses after the target terminal is selected;
the second generator is configured to output second allocation information until the first time elapses after the target terminal is selected;
each of the first request and the second request comprises identification information of the target terminal, reference information regarding the target terminal, and information indicating the first time;
in a case where one of the first allocation information and the second allocation information satisfies a constraint defined by the communication standard, the allocation information generation device transmits, to the base station, one of the first allocation information and the second allocation information, which satisfies the constraint;
the base station communicates with the terminal by using resources corresponding to the first allocation information or the second allocation information, which is transmitted from the allocation information generation device,
the first generator searches for the first allocation information within a first search range;
the second generator searches for the second allocation information within a second search range; and
the first search range is wider than the second search range.

2. The communication system of claim 1, wherein the resources include at least one of a time, a frequency, a space, power, a code, or orbital angular momentum.

3. The communication system of claim 1, wherein the allocation information generation device is configured to transmit the first allocation information or the second allocation information, which is highly evaluated by a predetermined evaluation method, to the base station in a case where the first allocation information and the second allocation information satisfy the constraint.

4. The communication system of claim 3, wherein the first allocation information or the second allocation information is more highly evaluated as transmission efficiency is better, a latency time is shorter, inter-terminal fairness is higher, or a latency achievement rate is higher.

5. The communication system of claim 1, wherein an evaluation value of the first allocation information is higher than an evaluation value of the second allocation information; and
the second allocation information better satisfies the constraint than the first allocation information.

6. The communication system of claim 1, wherein the allocation information generation device further comprises a third generator;
the third generator is configured to output third allocation information until the first time elapses after the target terminal is selected; and
the allocation information generation device is configured to output, to the base station, one of the first allocation information, the second allocation information, and the third allocation information which satisfies the constraint or is highly evaluated.

7. The communication system of claim 1, wherein the communication standard includes a standard for a fifth generation mobile communication system.

8. The communication system of claim 1, wherein a resource block is formed by a plurality of symbols in a time direction and a plurality of subcarriers in a frequency direction;
a mini-slot is formed by two or more symbols as a part of a plurality of the symbols and a plurality of the subcarriers; and
the first allocation information and the second allocation information indicate that the resource element is allocated to the target terminal in units of mini-slots.

9. A communication method for a system comprising a base station configured to perform communication based on a communication standard with respect to a target terminal and an allocation information generation device configured to receive an allocation request from the base station and determine a resource used for the communication, wherein the allocation request comprises a first request and a second request, the allocation information generation device comprises a first generator configured to perform a first processing in response to the first request and a second generator configured to perform a second processing in response to the second request, the second processing being different from the first processing; the method comprising:
- selecting the target terminal from terminals;
- outputting, by the first generator, first allocation information until a first time elapses after the target terminal is selected;
- outputting, by the second generator, second allocation information until the first time elapses after the target terminal is selected;
- in a case where one of the first allocation information and the second allocation information satisfies a constraint defined by the communication standard, transmitting, by the allocation information generation device, to the base station, one of the first allocation information and the second allocation information, which satisfies the constraint; and
- communicating, by the base station, with the target terminal by using resources corresponding to the first allocation information or the second allocation information, which is transmitted from the allocation information generation device, wherein:
- each of the first request and the second request comprises identification information of the target terminal, reference information regarding the target terminal, and information indicating the first time;
- the first generator searches for the first allocation information within a first search range;
- the second generator searches for the second allocation information within a second search range; and
- the first search range is wider than the second search range.

10. A communication system comprising:
- a base station configured to perform communication based on a communication standard with respect to a target terminal selected from terminals; and
- an allocation information generation device configured to receive an allocation request from the base station and determine a resource used for the communication, wherein
- the allocation request comprises a first request and a second request;
- the allocation information generation device comprises a first generator configured to perform a first processing in response to the first request and a second generator configured to perform a second processing in response to the second request, the second processing being different from the first processing;
- the first generator is configured to output first allocation information until a first time elapses after the target terminal is selected;
- the second generator is configured to output second allocation information until the first time elapses after the target terminal is selected;
- each of the first request and the second request comprises identification information of the target terminal, reference information regarding the target terminal, and information indicating the first time;
- in a case where one of the first allocation information and the second allocation information satisfies a constraint defined by the communication standard, the allocation information generation device transmits, to the base station, one of the first allocation information and the second allocation information, which satisfies the constraint;
- the base station communicates with the target terminal by using resources corresponding to the first allocation information or the second allocation information, which is transmitted from the allocation information generation device;
- the first generator is configured to generate the first allocation information based on all combinations of the terminals and resources; and
- the second generator is configured to generate the second allocation information based on some of all combinations of the terminals and the resources.

11. The communication system of claim 10, wherein the resources include at least one of a time, a frequency, a space, power, a code, or orbital angular momentum.

12. The communication system of claim 10, wherein
the allocation information generation device is configured to transmit the first allocation information or the second allocation information, which is highly evaluated by a predetermined evaluation method, to the base station in a case where the first allocation information and the second allocation information satisfy the constraint.

13. The communication system of claim 12, wherein
the first allocation information or the second allocation information is more highly evaluated as transmission efficiency is better, a latency time is shorter, inter-terminal fairness is higher, or a latency achievement rate is higher.

14. The communication system of claim 10, wherein
an evaluation value of the first allocation information is higher than an evaluation value of the second allocation information; and
the second allocation information better satisfies the constraint than the first allocation information.

15. The communication system of claim 10, wherein
the allocation information generation device further comprises a third generator;
the third generator is configured to output third allocation information until the first time elapses after the target terminal is selected; and
the allocation information generation device is configured to output, to the base station, one of the first allocation information, the second allocation information, and the third allocation information which satisfies the constraint or is highly evaluated.

16. The communication system of claim 10, wherein the communication standard includes a standard for a fifth generation mobile communication system.

17. The communication system of claim 10, wherein
a resource block is formed by a plurality of symbols in a time direction and a plurality of subcarriers in a frequency direction;
a mini-slot is formed by two or more symbols as a part of a plurality of the symbols and a plurality of the subcarriers; and
the first allocation information and the second allocation information indicate that the resource element is allocated to the target terminal in units of mini-slots.

18. A communication method for a system comprising a base station configured to perform communication based on a communication standard with respect to a target terminal and an allocation information generation device configured to receive an allocation request from the base station and determine a resource used for the communication, wherein the allocation request comprises a first request and a second request, the allocation information generation device comprises a first generator configured to perform a first processing in response to the first request and a second generator configured to perform a second processing in response to the second request, the second processing being different from the first processing; the method comprising:

selecting the target terminal from terminals;

outputting, by the first generator, first allocation information until a first time elapses after the target terminal is selected;

outputting, by the second generator, second allocation information until the first time elapses after the target terminal is selected;

in a case where one of the first allocation information and the second allocation information satisfies a constraint defined by the communication standard, transmitting, by the allocation information generation device, to the base station, one of the first allocation information and the second allocation information, which satisfies the constraint; and communicating, by the base station, with the target terminal by using resources corresponding to the first allocation information or the second allocation information, which is transmitted from the allocation information generation device, wherein each of the first request and the second request comprises identification information of the target terminal, reference information regarding the target terminal, and information indicating the first time;

the first generator is configured to generate the first allocation information based on all combinations of the terminals and resources; and the second generator is configured to generate the second allocation information based on some of all combinations of the terminals and the resources.

19. A communication system comprising:

a base station configured to perform communication based on a communication standard with respect to a target terminal selected from terminals; and an allocation information generation device configured to receive an allocation request from the base station and determine a resource used for the communication, wherein the allocation request comprises a first request and a second request;

the allocation information generation device comprises a first generator configured to perform a first processing in response to the first request and a second generator configured to perform a second processing in response to the second request, the second processing being different from the first processing;

the first generator is configured to output first allocation information until a first time elapses after the target terminal is selected;

the second generator is configured to output second allocation information until the first time elapses after the target terminal is selected;

each of the first request and the second request comprises identification information of the target terminal, reference information regarding the target terminal, and information indicating the first time;

in a case where one of the first allocation information and the second allocation information satisfies a constraint defined by the communication standard, the allocation information generation device transmits, to the base station, one of the first allocation information and the second allocation information, which satisfies the constraint;

the base station communicates with the target terminal by using resources corresponding to the first allocation information or the second allocation information, which is transmitted from the allocation information generation device;

the terminals comprise a first terminal and a second terminal;

the allocation information generation device comprises a first device and a second device;

the first device is configured to determine resources related to the first terminal;

the second device is configured to determine resources related to the second terminal; and the first terminal and the second terminal have different requests for a communication capacity or a latency time.

20. The communication system of claim 19, wherein the resources include at least one of a time, a frequency, a space, power, a code, or orbital angular momentum.

21. The communication system of claim 19, wherein the allocation information generation device is configured to transmit the first allocation information or the second allocation information, which is highly evaluated by a predetermined evaluation method, to the base station in a case where the first allocation information and the second allocation information satisfy the constraint.

22. The communication system of claim 21, wherein the first allocation information or the second allocation information is more highly evaluated as transmission efficiency is better, a latency time is shorter, inter-terminal fairness is higher, or a latency achievement rate is higher.

23. The communication system of claim 19, wherein an evaluation value of the first allocation information is higher than an evaluation value of the second allocation information; and the second allocation information better satisfies the constraint than the first allocation information.

24. The communication system of claim 19, wherein the allocation information generation device further comprises a third generator;

the third generator is configured to output third allocation information until the first time elapses after the target terminal is selected; and the allocation information generation device is configured to output, to the base station, one of the first allocation information, the second allocation information, and the third allocation information which satisfies the constraint or is highly evaluated.

25. The communication system of claim 19, wherein the communication standard includes a standard for a fifth generation mobile communication system.

26. The communication system of claim 19, wherein a resource block is formed by a plurality of symbols in a time direction and a plurality of subcarriers in a frequency direction;

a mini-slot is formed by two or more symbols as a part of a plurality of the symbols and a plurality of the sub-carriers; and the first allocation information and the second allocation information indicate that the resource element is allocated to the target terminal in units of mini-slots.

27. A communication method for a system comprising a base station configured to perform communication based on a communication standard with respect to a target terminal and an allocation information generation device configured to receive an allocation request from the base station and determine a resource used for the communication, wherein the allocation request comprises a first request and a second request, the allocation information generation device comprises a first generator configured to perform a first processing in response to the first request and a second generator configured to perform a second processing in response to the second request, the second processing being different from the first processing; the method comprising:

selecting the target terminal from terminals;

outputting, by the first generator, first allocation information until a first time elapses after the target terminal is selected;

outputting, by the second generator, second allocation information until the first time elapses after the target terminal is selected;

in a case where one of the first allocation information and the second allocation information satisfies a constraint defined by the communication standard, transmitting, by the allocation information generation device, to the base station, one of the first allocation information and the second allocation information, which satisfies the constraint; and communicating, by the base station, with the target terminal by using resources corresponding to the first allocation information or the second allocation information, which is transmitted from the allocation information generation device, and wherein each of the first request and the second request comprises identification information of the target terminal, reference information regarding the target terminal, and information indicating the first time;

the terminals comprise a first terminal and a second terminal;

the allocation information generation device comprises a first device and a second device;

the first device is configured to determine resources related to the first terminal;

the second device is configured to determine resources related to the second terminal; and the first terminal and the second terminal have different requests for a communication capacity or a latency time.

\* \* \* \* \*